United States Patent
Legrand et al.

(10) Patent No.: US 10,606,883 B2
(45) Date of Patent: Mar. 31, 2020

(54) SELECTION OF INITIAL DOCUMENT COLLECTION FOR VISUAL INTERACTIVE SEARCH

(71) Applicant: Evolv Technology Solutions, Inc., San Francisco, CA (US)

(72) Inventors: Diego Legrand, San Francisco, CA (US); Philip M. Long, Palo Alto, CA (US); Nigel Duffy, San Francisco, CA (US)

(73) Assignee: EVOLV TECHNOLOGY SOLUTIONS, INC., San Francisco, CA (US)

( * ) Notice: Subject to any disclaimer, the term of this patent is extended or adjusted under 35 U.S.C. 154(b) by 522 days.

(21) Appl. No.: 15/295,930

(22) Filed: Oct. 17, 2016

(65) Prior Publication Data
US 2017/0031904 A1 Feb. 2, 2017

Related U.S. Application Data

(63) Continuation-in-part of application No. PCT/IB2015/001267, filed on May 4, 2015, which is
(Continued)

(51) Int. Cl.
*G06F 16/58* (2019.01)
*G06F 16/38* (2019.01)
(Continued)

(52) U.S. Cl.
CPC .............. *G06F 16/58* (2019.01); *G06F 16/34* (2019.01); *G06F 16/38* (2019.01); *G06F 16/583* (2019.01);
(Continued)

(58) Field of Classification Search
CPC .... G06F 17/18; G06F 16/904; G06F 16/2462; G06F 16/444; G06F 16/54; G06F 17/16; G06F 16/583
(Continued)

(56) References Cited

U.S. PATENT DOCUMENTS 5,696,964 A 12/1997 Cox et al.
5,930,784 A 7/1999 Hendrickson
(Continued)

OTHER PUBLICATIONS

Allesiardo, et al., "A Neural Networks Committee for the Contextual Bandit Problem." Neural Information Processing. Springer International Publishing, 8 pages (2014).
(Continued)

*Primary Examiner* — Angelica Ruiz
(74) *Attorney, Agent, or Firm* — Haynes Beffel & Wolfeld LLP; Warren S. Wolfeld; Andrew L. Dunlap

(57) ABSTRACT

Roughly described, a system for user identification of a desired document. A database identifies a catalog of documents in an embedding space, in which the distance between documents corresponds to a measure of their dissimilarity. The system presents an initial collection of the documents toward the user from an initial candidate space which is part of the embedding space, then in response to iterative user input, refines the candidate space and subsequent collections of documents presented toward the user. The initial collection is determined using a weighted cost-based iterative addition to the initial collection of documents from the initial candidate space, trading off between two sub-objectives of representativeness and diversity.

27 Claims, 19 Drawing Sheets

Related U.S. Application Data a continuation-in-part of application No. 14/494,364, filed on Sep. 23, 2014, now abandoned.

(60) Provisional application No. 62/242,258, filed on Oct. 15, 2015, provisional application No. 61/994,048, filed on May 15, 2014.

(51) Int. Cl.
*G06F 16/34* (2019.01)
*G06F 16/583* (2019.01)
*G06F 16/904* (2019.01)
*G06F 16/9535* (2019.01)

(52) U.S. Cl.
CPC ........ *G06F 16/904* (2019.01); *G06F 16/9535* (2019.01)

(58) Field of Classification Search
USPC ........... 707/600–831, 899, 999.001–999.206
See application file for complete search history.

(56) References Cited

U.S. PATENT DOCUMENTS

| | | | |
|---|---|---|---|
| 6,098,034 A | 8/2000 | Razin et al. | |
| 6,286,018 B1 | 9/2001 | Pitkow et al. | |
| 6,353,825 B1 | 3/2002 | Ponte | |
| 6,574,616 B1 | 6/2003 | Saghir | |
| 7,099,860 B1 | 8/2006 | Liu et al. | |
| 7,152,031 B1 | 12/2006 | Jensen et al. | |
| 7,200,243 B2* | 4/2007 | Keenan | G06K 9/0063 382/100 |
| 7,480,640 B1* | 1/2009 | Elad | G06Q 10/10 706/14 |
| 7,567,960 B2* | 7/2009 | Wei | G06F 16/353 |
| 7,813,581 B1 | 10/2010 | Fitzpatrick et al. | |
| 7,814,107 B1 | 10/2010 | Thirumalai et al. | |
| 8,027,541 B2 | 9/2011 | Hua et al. | |
| 8,150,822 B2 | 4/2012 | Bluvband et al. | |
| 8,160,939 B2 | 4/2012 | Schrenk | |
| 8,170,966 B1* | 5/2012 | Musat | H04L 51/12 706/14 |
| 8,254,697 B2 | 8/2012 | Isard et al. | |
| 8,676,802 B2 | 3/2014 | Zelevinsky et al. | |
| 8,832,134 B2 | 9/2014 | Gronow et al. | |
| 8,843,478 B1 | 9/2014 | Jing et al. | |
| 8,972,394 B1 | 3/2015 | Tong et al. | |
| 9,116,976 B1 | 8/2015 | Bem et al. | |
| 10,102,277 B2 | 10/2018 | Legrand et al. | |
| 2002/0091678 A1 | 7/2002 | Miller et al. | |
| 2002/0138478 A1 | 9/2002 | Schwartz et al. | |
| 2002/0164078 A1 | 11/2002 | Uehara et al. | |
| 2004/0107194 A1 | 6/2004 | Thorpe | |
| 2005/0165600 A1 | 7/2005 | Kasravi et al. | |
| 2006/0212415 A1 | 9/2006 | Backer et al. | |
| 2007/0011154 A1 | 1/2007 | Musgrove et al. | |
| 2007/0288432 A1 | 12/2007 | Weltman et al. | |
| 2008/0126464 A1* | 5/2008 | Mowzoon | G06K 9/6253 708/442 |
| 2008/0243842 A1 | 10/2008 | Liang et al. | |
| 2008/0306943 A1 | 12/2008 | Patterson | |
| 2009/0132347 A1* | 5/2009 | Anderson | G06Q 30/02 705/14.52 |
| 2010/0104191 A1 | 4/2010 | McGwire | |
| 2010/0134415 A1 | 6/2010 | Iwase et al. | |
| 2010/0223258 A1 | 9/2010 | Ghahramani et al. | |
| 2010/0293117 A1* | 11/2010 | Xu | G06N 20/00 706/12 |
| 2011/0029561 A1 | 2/2011 | Slaney et al. | |
| 2011/0064316 A1 | 3/2011 | Hamamura et al. | |
| 2011/0246409 A1* | 10/2011 | Mitra | G06F 17/18 706/52 |
| 2013/0191381 A1 | 7/2013 | Jin et al. | |
| 2013/0212090 A1 | 8/2013 | Sperling et al. | |
| 2013/0226922 A1* | 8/2013 | Labenski | G06F 16/35 707/737 |
| 2013/0246439 A1 | 9/2013 | Liekens et al. | |
| 2014/0019431 A1 | 1/2014 | Suleyman et al. | |
| 2014/0019484 A1 | 1/2014 | Coppin et al. | |
| 2014/0222789 A1 | 8/2014 | Gras | |
| 2015/0036948 A1 | 2/2015 | Wenzel et al. | |
| 2015/0286957 A1 | 10/2015 | Knight | |
| 2016/0350336 A1 | 12/2016 | Checka et al. | |
| 2017/0091319 A1 | 3/2017 | Legrand et al. | |

OTHER PUBLICATIONS

Auer et al., "Finite-time analysis of the multiarmed bandit problem," Machine learning 47.2-3 (2002): 235-256.

Bouneffouf, et al., "A contextual-bandit algorithm for mobile context-aware recommender system." Neural Information Processing. Springer Berlin Heidelberg, 9 Pages (2012).

Burnetas et al., "Optimal adaptive policies for sequential allocation problems." Advances in Applied Mathematics 17.2 (1996): 122-142.

Burnetas and Katehakis, "Optimal adaptive policies for Markov decision processes." Mathematics of Operations Research 22.1 (1997): 222-255.

Chu, et al., "Contextual bandits with linear payoff functions," In International Conference on Artificial Intelligence and Statistics, pp. 208-214 (2011).

Filippi, et al., "Optimism in reinforcement learning and Kullback-Leibler divergence." Communication, Control, and Computing (Allerton), 2010 48th Annual Allerton Conference on. IEEE, 22 pages (2010).

Gittins, "Bandit processes and dynamic allocation indices." Journal of the Royal Statistical Society. Series B (Methodological) (1979): 148-177.

Honda and Takemura, "An asymptotically optimal policy for finite support models in the multiarmed bandit problem." Machine Learning 85.3 (2011): 361-391.

Katehakis et al., "Sequential choice from several populations." Proceedings of the National Academy of Sciences of the United States of America 92.19 (1995): 8584-8585.

Katehakis et al., "The multi-armed bandit problem: decomposition and computation." Mathematics of Operations Research 12.2 (1987): 262-268.

Lai et al., "Asymptotically efficient adaptive allocation rules." Advances in applied mathematics 6.1 (1985): 4-22.

Langford and Zhang, "The epoch-greedy algorithm for multi-armed bandits with side information." In Advances in neural information processing systems, 8 page (2008).

Ortner, "Online regret bounds for Markov decision processes with deterministic transitions." Theoretical Computer Science 411.29 (2010): 2684-2695.

Perchet et al., "The multi-armed bandit problem with covariates." The Annals of Statistics, 41(2), 30 pages (2013).

Press, "Bandit solutions provide unified ethical models for randomized clinical trials and comparative effectiveness research." Proceedings of the National Academy of Sciences 106, No. 52 (2009): 22387-22392.

Rigollet, et al., "Nonparametric bandits with covariates." arXiv preprint arXiv:1003.1630, 18 pages (2010).

Robbins, "Some aspects of the sequential design of experiments." In Herbert Robbins Selected Papers, pp. 527-535 (1952).

Scott, "A modern Bayesian look at the multi-armed bandit." Applied Stochastic Models in Business and Industry 26.6 (2010): 639-658.

Slivkins, "Contextual bandits with similarity information." The Journal of Machine Learning Research 15.1, 30 pages (2014).

Tewari and Bartlett, "Optimistic linear programming gives logarithmic regret for irreducible MDPs." Advances in Neural Information Processing Systems, 8 pages (2008).

Tokic, "Adaptive ?-greedy exploration in reinforcement learning based on value differences." KI 2010: Advances in Artificial Intelligence. Springer Berlin Heidelberg, 8 pages (2010).

(56) References Cited

OTHER PUBLICATIONS

Tokic et al., "Value-difference based exploration: adaptive control between epsilon-greedy and softmax." KI 2011: Advances in Artificial Intelligence. Springer Berlin Heidelberg, 12 pages (2011).
Valko, et al. "Finite-time analysis of kernelised contextual bandits." arXiv preprint arXiv:1309.6869, 10 pages (2013).
Vermorel et al., "Multi-armed bandit algorithms and empirical evaluation." Machine Learning: ECML 2005. Springer Berlin Heidelberg, 2005. 437-448.
Walsh, et al., "Exploring compact reinforcement-learning representations with linear regression," In Proceedings of the Twenty-Fifth Conference on Uncertainty in Artificial Intelligence, AUAI Press, pp. 591-598 (2009).
Weber, "On the Gittins index for multiarmed bandits." The Annals of Applied Probability 2.4 (1992): 1024-1033.
"Package 'WeightedCluster'", https://cran.r-project.org/web/packages/WeightedCluster/WeightedCluster.pdf. accessed Dec. 8, 2016, 16 pages.
"Bayes' Theorem", Wikipedia, https://en.wikipedia.org/wiki/Bayes%27_theorem, accessed Nov. 11, 2016, 12 pages.
"Thompson sampling", Wikipedia, https://en.wikipedia.org/wiki/Thompson_sampling, accessed Dec. 8, 2016, 4 pages.
Cristianini, Nello, "Kernel Methods for General Pattern Analysis", nello@support-vector.net, accessed Oct. 11, 2016, 77 pages.
"Random projection", Wikipedia, https://en.wikipedia.org/wiki/Random_projection, acessed Mar. 7, 2016, 2 pages.
"Metropolis-Hastings algorithm", Wikipedia, https://en.wikipedia.org/wiki/Metropolis%E2%80%93Hastings_algorithm, accessed Mar. 7, 2016, 8 pages.
"Markov chain Monte Carlo", Wikipedia, https://en.wikipedia.org/wiki/Markov_chain_Monte_Carlo, accessed Mar. 7, 2016, 6 pages.
Studer, "WeightedCluster Library Manual: A practical guide to creating typologies of trajectories in the social sciences with R," Lives Working Papers, 24 pages (2013).
Agrawal et al., "Analysis of Thompson Sampling for the multi-armed bandit," J MLR: Workshop and Conference Proceedings vol. 23 (2012). 26 pages.
Herbster et al., "Tracking the Best Linear Predictor, Journal of Machine Learning Reseaarch," Sep. 2001, 29 pages.
Herbster et al, Tracking the Best Expert, Machine Learning, 32, 1998, 28 pages.
Chapelle et al, "An empirical evaluation of thompson sampling," Advances in neural information processing systems. 2011, 9 pages.
PCT/IB16/057510—International Search Report and Written Opinion dated Apr. 12, 2017, 22 pages.
GB 1621341.5—Voluntary Amendment dated Feb. 23, 2017, 47 pages.
PCT/IB2016/001590—International Search Report and Written Opinion dated May 11, 2017, 11 pages.
Stasko, et al., "Jigsaw: Supporting Investigative Analysis Through Interactive Visualization." Information Visualization 7.2 (2008): 118-132.
U.S. Appl. No. 14/494,364—Office Action dated Jun. 2, 2017, 61 pages.
CN 201580038513.4—Request for Examination filed May 15, 2017, 132 pages.
EP 15760512.2—Response to Rule 161(1) EPC Communication dated Jan. 27, 2017 filed Jul. 27, 2017, 56 pages.
PCT/IB16/01593—International Search Report and Written Opinion dated May 22, 2017, 14 pages.
U.S. Appl. No. 14/494,364—Response to Office Action dated Jun. 2, 2017, filed Nov. 2, 2017, 25 pages.
U.S. Appl. No. 15/373,897—Office Action dated Nov. 9, 2017 12 pages.
JP 2017-545913—Request for Examination and Amendment filed Jan. 18, 2018, 42 pages.
Ke, Yan, et al., "Efficient Near-duplicate Detection and Sub-image Retrieval", MM'04, Oct. 10-16, 2004, New York, 8 pages.
"Machine Learning", Wikipedia, http://en.wikipedia.org/wiki/Machine_learning, found on-line on Jul. 23, 2014, 7 pages.
"Search by Image—Inside Search—Google", http://www.google.com/insidesearch/features/images/searchbyimage.html, downloaded from internet on May 14, 2014, 3 pages.
"TinEye Reverse Image Search", http://www.tineye.com/, downloaded from the internet on May 14, 2014, 2 pages.
Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pages.
Bengio, Yoshua, "Learning Deep Architectures for AI", Foundations and Trends in Machine Learning, vol. 2, No. 1, published Nov. 15, 2009, pp. 1-71.
Boulton, Clint, "Google Image Swirl Renders Results Like Google Wonder Wheel", http:/www.eweek.com/search-engines/google-image-swirl-renders-results-like-google-wo . . . , posted on Nov. 17, 2009, 8 pages.
Dasgupta, Sanjoy, "Performance Guarantees for Hierarchical Clustering", Conference on Computational Learning Theory, Sydney, Australia, Jul. 8-10, 2002, pp. 351-363, 12 pages.
van Leuken, Reinier H., et al., "Visual Diversification of Image Search Results", WWW '09 Proceedings of the 18th International Conference on World Wide Web, Apr. 20-24, 2009, Madrid, Spain, p. 341-350.
Tenenbaum, Joshua B., et al., "A Global Geometric Framework for Nonlinear Dimensionality Reduction", Science, vol. 290, Dec. 22, 2000, p. 2319-2323.
"tf-idf", Wikipedia, http://en.wikipedia.org/wiki/Tf%E2%80%93idf, downloaded from internet on May 14, 2014, 4 pages.
Min, Renqiang, et al., "Deep Supervised t-Distributed Embedding", Proceedings of the 27th International Conference on Machine Learning, Haifa, Israel, Jun. 21-24, 2010, 8 pages.
"Bag-of-words model", Wikipedia, http://en.wikipedia.org/wiki/Bag-of-words_model, downloaded from the internet on May 14, 2014, 4 pages.
Cortes, Corinna, et al., "Algorithms for Learning Kernels Based on Centered Alignment", Journal of Machine Learning Research 13, published Mar. 2012, pp. 795-828.
Haussler, David, "Convolution Kernels on Discrete Structures", UCSC-CRL-99-10, University of California at Santa Cruz, Jul. 8, 1999, 38 pages.
Moreno, Pedro J., et al., "A Kullback-Leibler Divergence Based Kernel for SVM Classification in Multimedia Applications", in Advances in Neural Information Processing Systems 16, MIT Press, Jan. 9, 2004, 8 pages.
Lodhi, Huma, et al., "Text Classification using String Kernels", Journal of Machine Learning Research, vol. 2, published Feb. 2002, pp. 419-444.
Siddiquie, Behjat, et al., "Combining Multiple Kernels for Efficient Image Classification", Applications of Computer Vision (WACV), 2009 Workshop on, IEEE, Snowbird, Utah, Dec. 7-9, 2009, 8 pages.
U.S. Appl. No. 14/494,364—Final Office Action dated Feb. 5, 2018, 38 pages.
"Distance", Wikipedia, http://en.wikipedia.org/wiki/Distance, last modified on Jun. 4, 2014, 7 pages.
Balasubramanian, Mukund , and Schwartz, Eric L., "The Isomap Algorithm and Topological Stability", Science, vol. 295, Jan. 4, 2002, p. 7a, 3 pages.
"Metric Tree", Wikipedia, http://en.wikipedia.org/wiki/Metric_tree, last modified on Jun. 12, 2014, 2 pages.
Ishiwaka et al., "MindReader: Querying Databases Through Multiple Examples," VLDB'98, Proceedings of 24th International Conference on Very Large Data Bases, Aug. 24-27, 1998, New York City, pp. 218-227.
Drucker et al., "Support Vector Machines: Relevance Feedback and Information Retrieval," Information Processing and Management 38 (2002), pp. 305-323 (accepted May 11, 2001).
Rui et al., "Relevance Feedback: A Power Tool for Interactive Content-Based Image Retrieval," Circuits and Systems for Video Technology, IEEE Transactions on, vol. 8, No. 5, Sep. 1998, pp. 1-13.
Tieu et al., "Boosting Image Retrieval," International Journal of Computer Vision 56(1/2), pp. 17-36, 2004 (Accepted Jul. 16, 2003).

(56) References Cited

OTHER PUBLICATIONS

Tong, et al., "Support Vector Machine Active Learning for Image Retrieval," In Proceedings of the ACM International Conference on Multimedia, 12 pages, ACM Press, 2001.

Kovashka, et al., "WhittleSearch: Image Search with Relative Attribute Feedback," Proceedings of the IEEE Conference on Computer Vision and Pattern Recognition (CVPR) (2012) 8 pages.

Zhou, Xiang Sean, and Thomas S. Huang. "Relevance feedback in image retrieval: A comprehensive review." Multimedia systems 8.6 (2003), 25 pages.

Manning et al., Introduction to Information Retrieval, Chapter 9: Relevance Feedback and Query Expansion, Cambridge University Press, Apr. 1, 2009, pp. 177-194.

He, Jingrui, et al. "Manifold-ranking based image retrieval." Proceedings of the 12th annual ACM international conference on Multimedia. ACM, 2004, pp. 9-16.

Zhang et al., "iFind-A Sstem for Semantics and Feature Based Image Retrieval Over Internet," Proc. ACM Multimedia, ACM Press 2000, 2 pages.

Fang, et al., "Experiments in mental face retrieval." Audio-and Video-Based Biometric Person Authentication. Springer Berlin Heidelberg, 2005, 10 pages.

Vinay, et al. "Evaluating relevance feedback algorithms for searching on small displays." Advances in Information Retrieval. Springer Berlin Heidelberg, 2005. 185-199.

Vinay, et al. "Evaluating relevance feedback and display strategies for searching on small displays." String Processing and Information Retrieval. Springer Berlin Heidelberg, 2004, 2 pages.

Datta, et al. "Image retrieval: Ideas, Influences, and Trends of the New Age." ACM Computing Surveys (CSUR) 40.2 (2008): 5, 60 pages.

Tao et al., "Asymmetric Bagging and Random Subspace for Support Vector Machines-Based Relevance Feedback in Image Retrieval," IEEE Transactions on Pattern Analysis and Machine Intelligence, vol. 28, No. 7, Jul. 2006, pp. 1088-1099.

Cox, et al. "The Bayesian Image Retrieval System, PicHunter: Theory, Implementation, and Psychophysical Experiments." Image Processing, IEEE Transactions on 9.1 (2000): pp. 20-37.

Cox, et al. "An Optimized Interaction Strategy for Bayesian Relevance Feedback." Computer Vision and Pattern Recognition, 1998. Proceedings. 1998 IEEE Computer Society Conference on. IEEE, 1998, 6 pages.

Cox, et al. "Pichunter: Bayesian relevance feedback for image retrieval." Pattern Recognition, 1996., Proceedings of the 13th International Conference on. vol. 3. IEEE, 1996, 6 pages.

"Rocchio Algorithm," Wikipedia, http://en.wikipedia.org/wiki/Rocchio_algorithm, accessed Apr. 29, 2015, 3 pages.

"Online Machine Learning," Wikipedia, http://en.wikipedia.org/wiki/Online_machine_learning, accessed Apr. 29, 2015, 6 pages.

"Multi-Armed Bandit," Wikipedia, http://en.wikipedia.org/wiki/Multi-armed_bandit,a ccessed Apr. 29, 2015, 10 pages.

"k-Means Clustering," WIkipedia, http://en.wikipedia.org/wiki/K-means_clustering, accessed Apr. 29, 2015, 9 pages.

"k-Medoids," Wlkipedia, http://en.wikipedia.org/wiki/K-means_clustering, accessed Apr. 29, 2015, 7 pages.

Brisaboa et al., "Spatial Selection of Sparse Pivots for Similarity Search in Metric Spaces," JCS&T vol. 7 No. 1, Apr. 2007, 6 pages.

Elad, et al., "Content Based Retrieval of VRML Objects—An Iterative and Interactive Approach," Springer Vienna, 2002, 12 pages.

Collins, et al., "New Ranking Algorithms for Parsing and Tagging: Kernels Over Discrete Structures, and the Voted Perceptron," ACL '02 Proceedings of the 40th Annual Meeting on Association for Computational Linguistics, 2002, 9 pages.

Freund, et al., "An Efficient Boosting Algorithm for Combining Preferences," Journal of Machine Learning Research 4 (2003) 37 pages.

PCT/IB2015/001267—International Search Report and Written Opinion dated Oct. 15, 2015, 9 pages.

Cesa-Bianchi et al., "Prediction, Learning, and Games," Cambridge University Press, 2006, 403 pages.

PCT/IB2015/001267—International Preliminary Report on Patentability dated Nov. 15, 2016, 7 pages.

Johnson, "Approximation Algorithms for Combinatorial Problems", MIT, 1974, pp. 38-49.

U.S. Appl. No. 15/373,897—Response to Office Action dated Nov. 9, 2017, filed Apr. 3, 2018, 35 pages.

U.S. Appl. No. 15/373,897—Notice of Allowance dated Jun. 11, 2018, 29 pages.

U.S. Appl. No. 14/494,364—Response to Final Office Action dated Feb. 5, 2018, filed May 1, 2018, 33 pages.

U.S. Appl. No. 14/494,364—Office Action dated Jun. 27, 2018, 31 pages.

PCT/IB16/057510—International Preliminairy Report on Patentabilitu (Chap 1) dated Jun. 21, 2018, 13 pages.

PCT/IB16/01593—International Preliminary report on Petentability (Chap 1) dated Apr. 26, 2018, 9 pages.

U.S. Appl. No. 15/311,163—Office Action dated Dec. 26, 2018, 47 pages.

EP 15760512-2—First Office Action dated Feb. 1, 2019, 8 pages.

"Use GMail offline with Google Gears", Internet Citation, XP002585516, retrieved from the Internet: URL:http://geniushackers.com/blog/2009/01/28/use-gmail-offline-with-google-gears/, Jan. 28, 2009, pp. 1-6.

EP 15760512-2—Response to First Office Action dated Feb. 1, 2019, as filed Jun. 6, 2019, 8 pages.

* cited by examiner

SELECTION OF INITIAL DOCUMENT COLLECTION FOR VISUAL INTERACTIVE SEARCH

CROSS-REFERENCE TO OTHER APPLICATIONS

This application claims the benefit under 35 U.S.C. 119(e) of U.S. provisional application No. 62/242,258, entitled "SELECTION OF INITIAL DOCUMENT COLLECTION FOR VISUAL INTERACTIVE SEARCH," filed 15 Oct. 2015.

This application also claims priority to and is a Continuation-In-Part of PCT application No. PCT/M2015/001267, entitled "VISUAL INTERACTIVE SEARCH," by Nigel Duffy, filed 4 May 2015, which is a continuation-in-part of U.S. application Ser. No. 14/494,364, entitled "VISUAL INTERACTIVE SEARCH," by Nigel Duffy, filed 23 Sep. 2014, which claims the benefit under 35 U.S.C. 119(e) of U.S. provisional application No. 61/994,048, entitled "VISUAL INTERACTIVE SEARCH," by Nigel Duffy, filed 15 May 2014.

All of the above applications are incorporated herein in their entirety.

BACKGROUND

The invention relates generally to a tool for searching for digital documents in an interactive and visual way. Examples of digital documents include: photographs, product descriptions, or webpages. For example this tool may be used on a mobile device to search for furniture available for sale via an online retailer.

More specifically, this invention relates to document retrieval with relevance feedback.

Current computer search technologies allow users to perform queries and respond to those queries with an ordered list of results. The queries may be in the form of a structured query language, natural language text, speech, or a reference image. However, the results returned often do not satisfy the user's search goal. The user then proceeds to refine or modify the query in an attempt to better achieve desired goals.

SUMMARY

Aspects of the present disclosure are to address at least the above-mentioned problems and/or disadvantages and to provide at least the advantages described below. Accordingly, an aspect of the present disclosure is to provide a system that uses a novel, visual and iterative search technique with relative feedback.

In accordance with an aspect of the present disclosure, roughly described, a system helps a user identify a desired document from a catalog of documents. A database identifies the catalog of documents in an embedding space, in which the distance between documents corresponds to a measure of their dissimilarity. The system presents an initial collection of the documents toward the user from an initial candidate space which is part of the embedding space, then in response to iterative user input, refines the candidate space and subsequent subsets of documents presented toward the user. The initial collection is determined using a weighted cost-based iterative addition to the initial collection of documents from the initial candidate space, trading off between two sub-objectives of representativeness and diversity. The initial collection determination can be used in other methods and systems, other than those for iterative identification of a desired document from a catalog of documents.

In accordance with another aspect of the present disclosure, a non-transitory computer-readable recording medium is provided, which contains software code portions that implement aspects of the above method.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific implementations thereof, and reference will be made to the drawings, in which.

DETAILED DESCRIPTION

The following description is presented to enable any person skilled in the art to make and use the invention, and is provided in the context of a particular application and its requirements. Various modifications to the disclosed implementations will be readily apparent to those skilled in the art, and the general principles defined herein may be applied to other implementations and applications without departing from the spirit and scope of the present invention. Thus, the present invention is not intended to be limited to the implementations shown, but is to be accorded the widest scope consistent with the principles and features disclosed herein.

Figure 2:
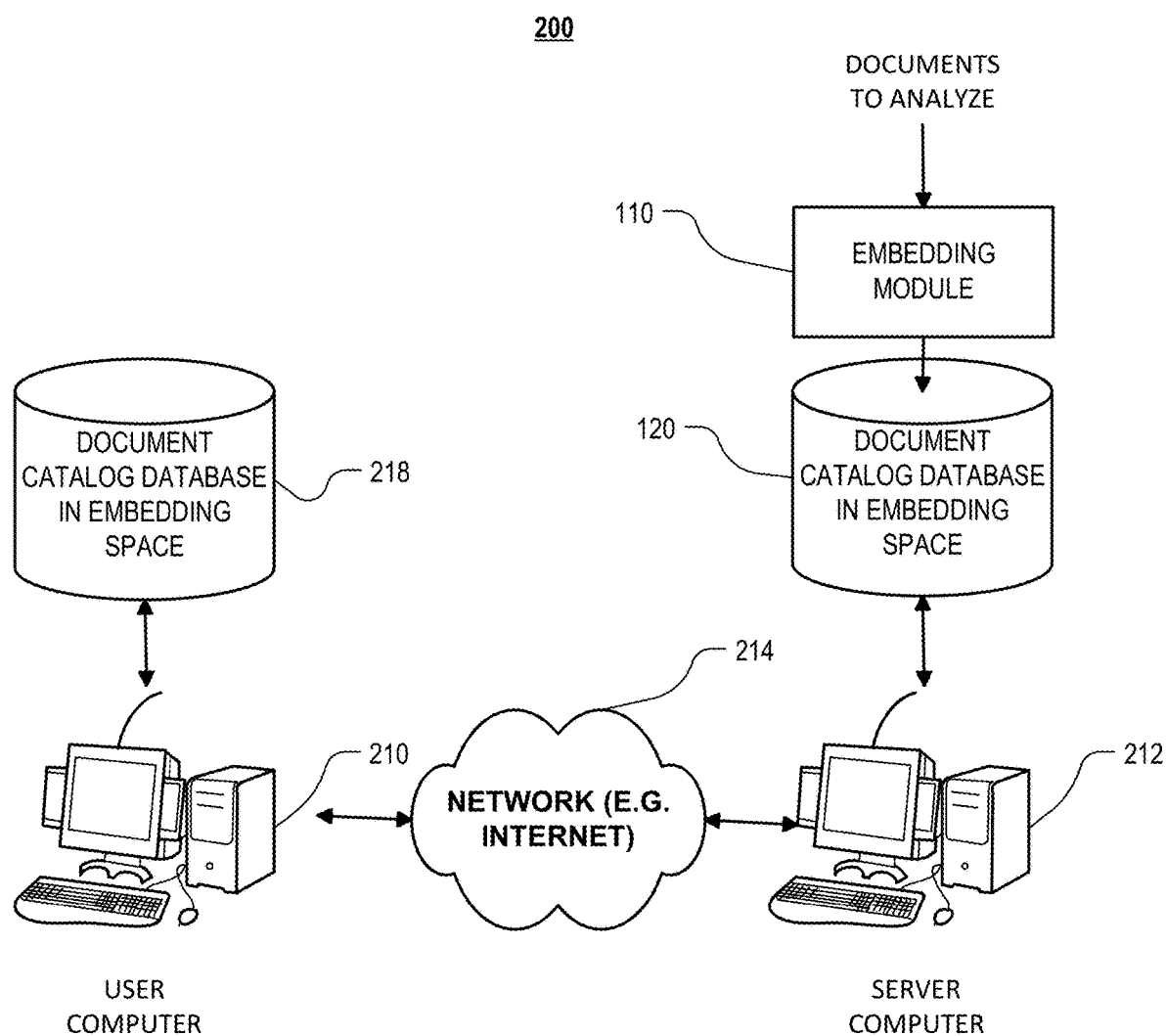
FIG. 2 illustrates a visual interactive search system according to an implementation of the present disclosure.
Figure 3:
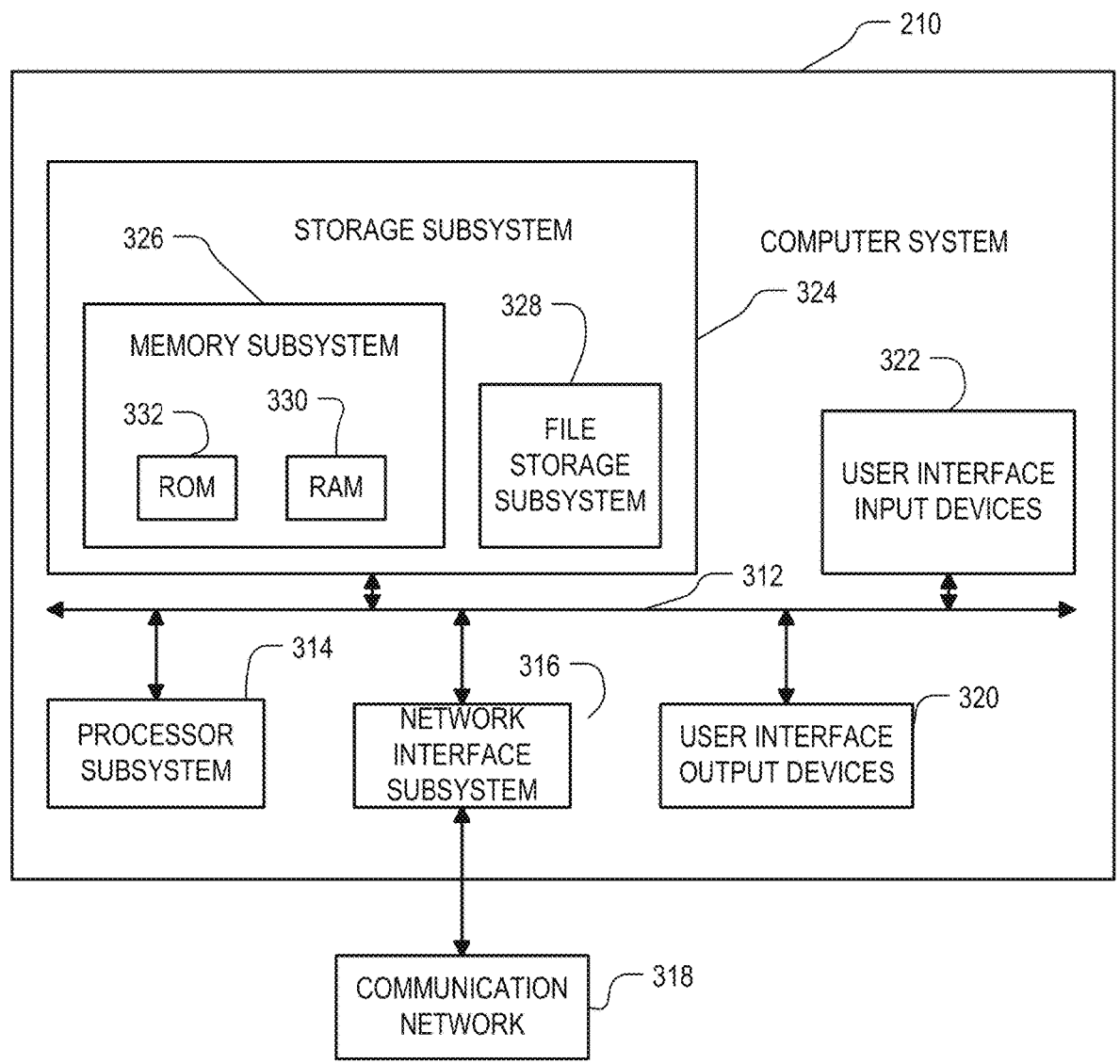
FIG. 3 is a block diagram of a user computer and/or a server computer, as illustrated in FIG. 2, that can be used to implement software incorporating aspects of the visual interactive search system according to an implementation of the present disclosure.
Figure 4:
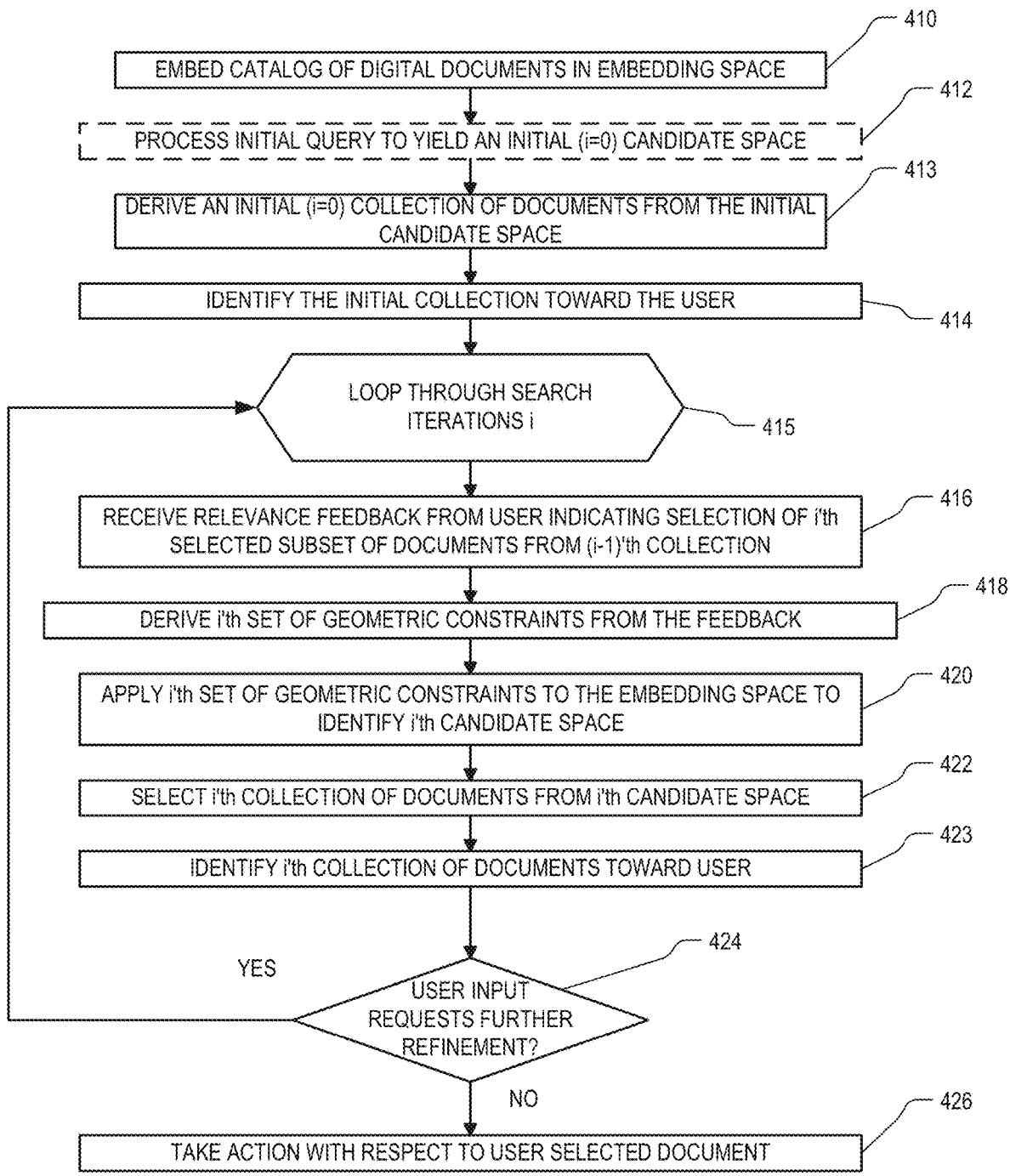
FIG. 4 is a flowchart illustrating various logic phases through which a visual interactive search system may proceed according to an implementation of the present disclosure.
Figure 5:
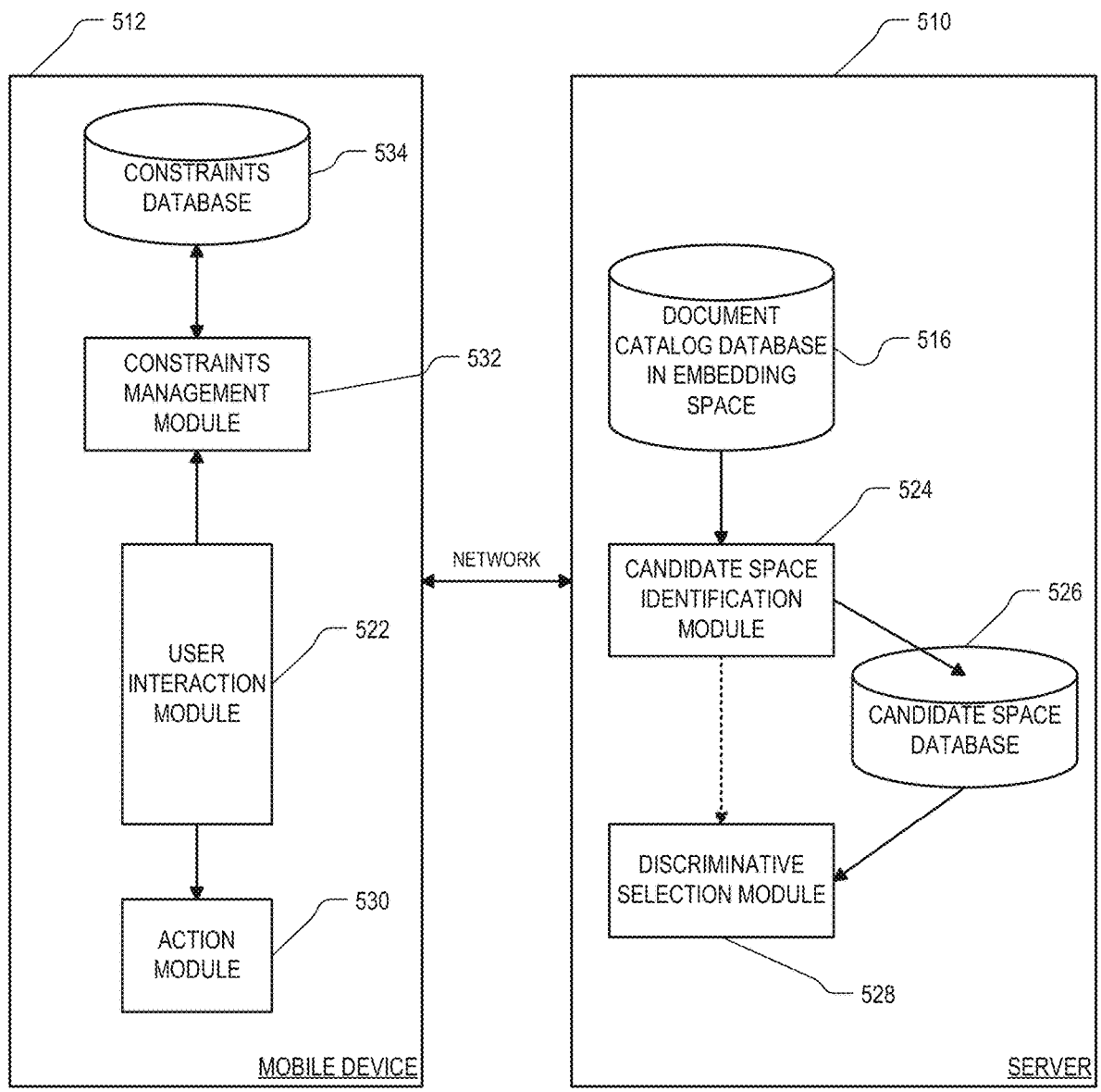
FIG. 5 is a block diagram of various components of a server and a mobile device for implementing the visual interactive search system according to an implementation of the present disclosure.
Figure 6:
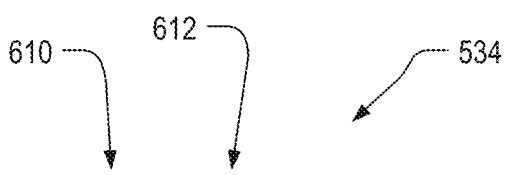
FIG. 6 illustrates contents of a constraints database of FIG. 5 according to an implementation of the present disclosure.
Figure 7:
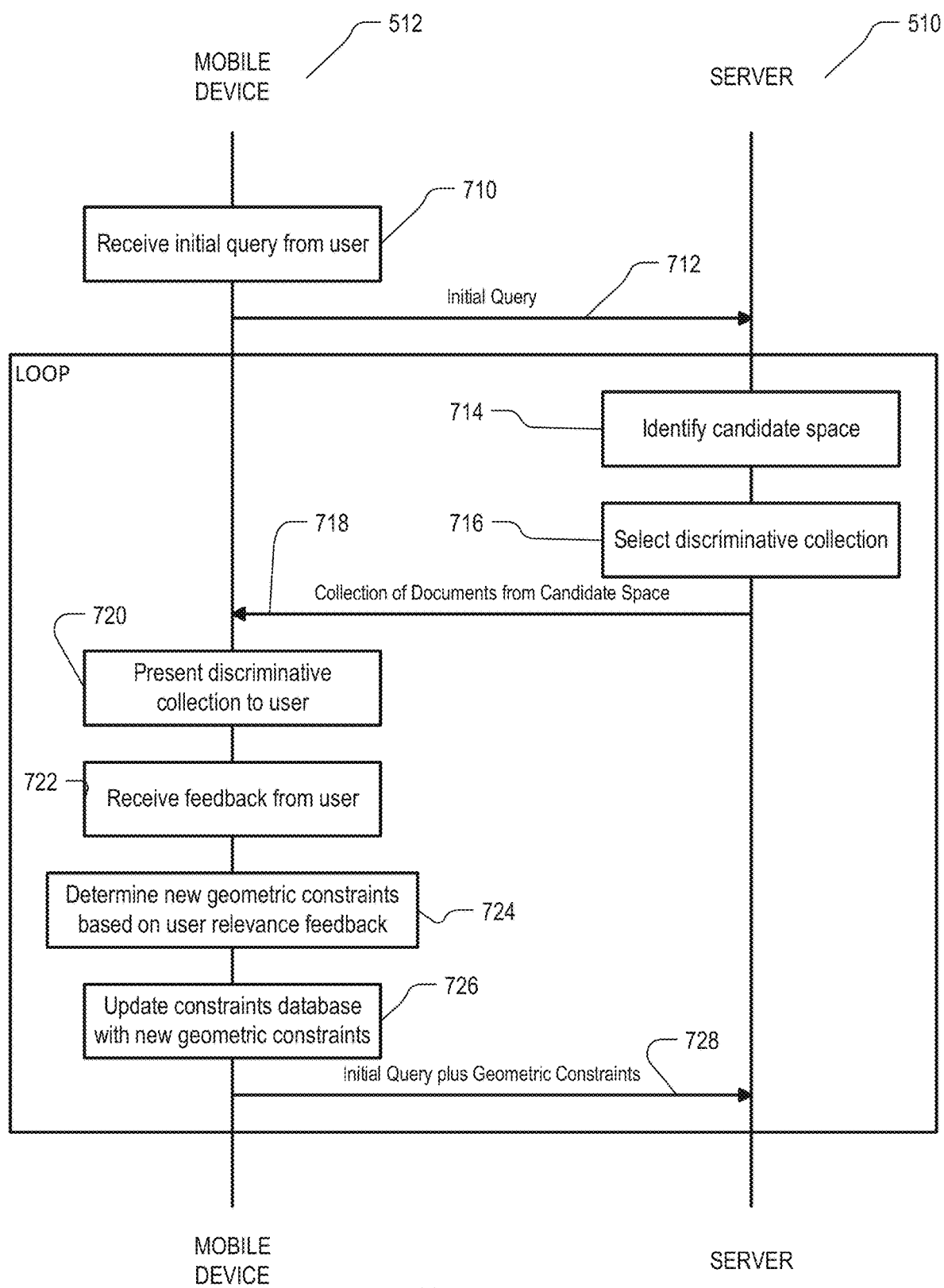
FIG. 7 is a diagram illustrating primary types of messages that pass between a mobile device and a server, as illustrated in FIG. 6, according to an implementation of the present disclosure
Figure 12:
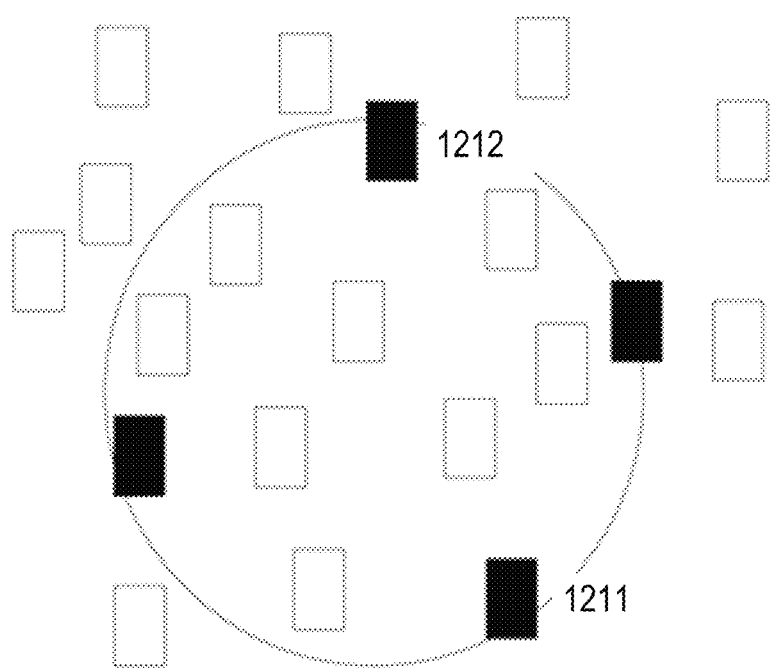
Figure 13A:
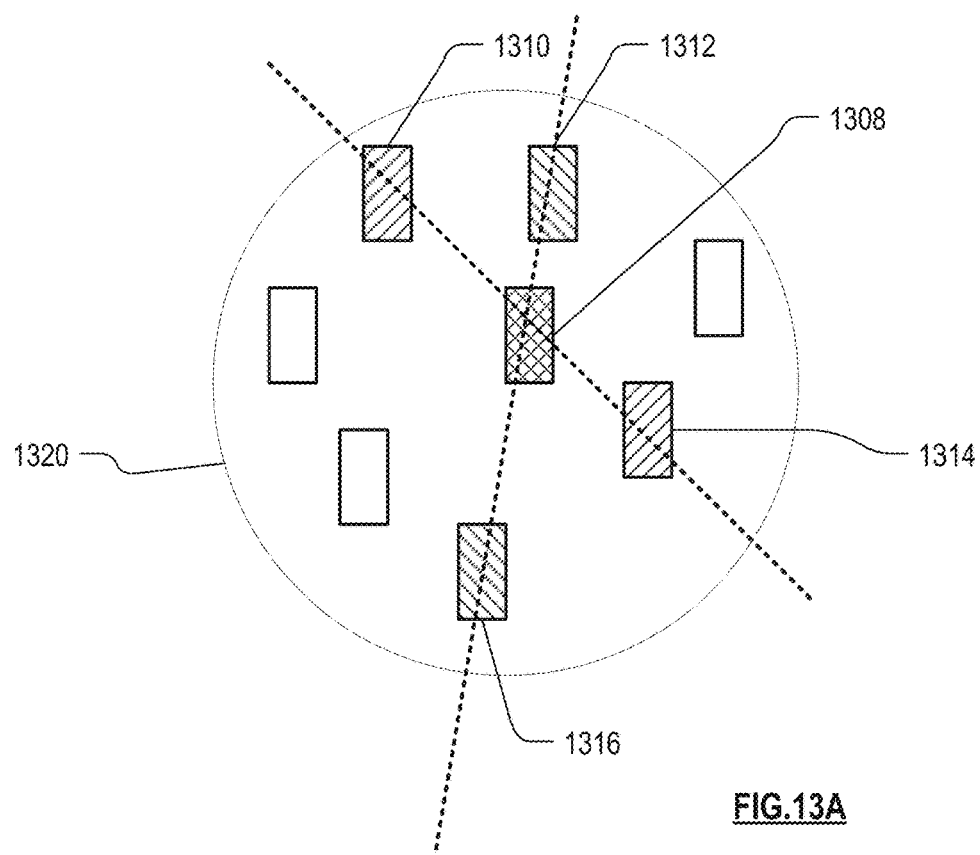
Figure 13B:
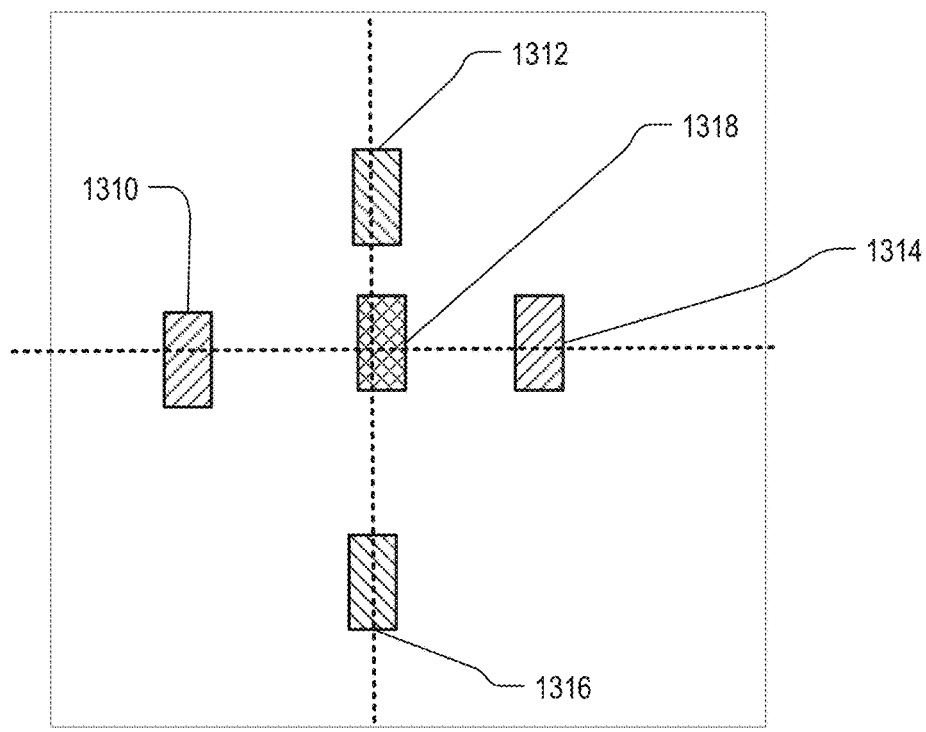
Figure 14:
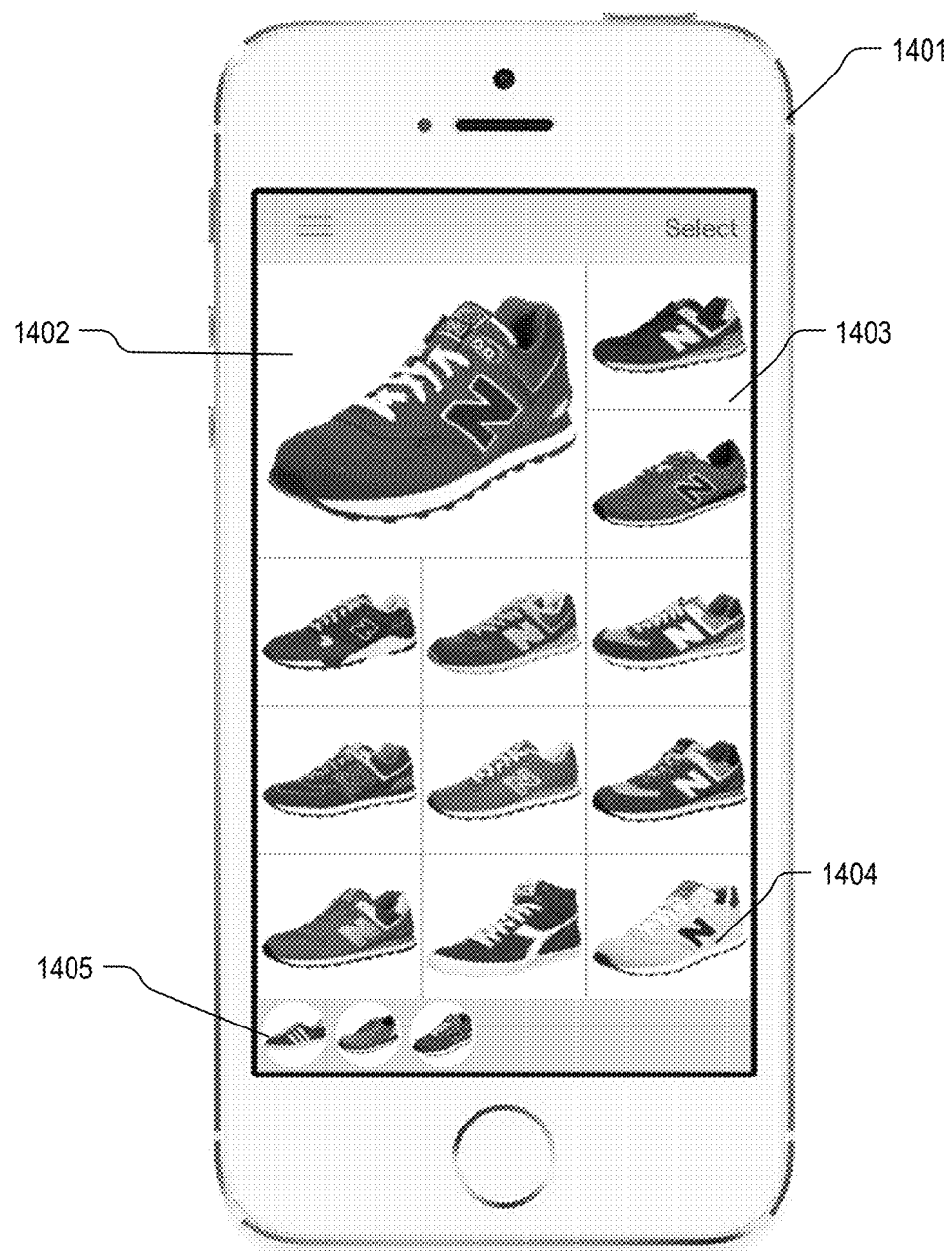
FIG. 14 illustrates a visual interface that enables searching for shoes using a visual interactive search environment on a mobile device according to an implementation of the present disclosure.

Generally, FIGS. 1-4 illustrate an overall high-level architecture and process flow of a visual interactive search system, FIGS. 5-7 illustrate a mobile device and server implementation of a visual interactive search system, FIGS. 8-13B illustrate specific implementations of embedding documents in an embedding space, FIG. 14 illustrates an implementation of the visual interactive search system for searching for physical and digital products, and FIGS. 15-19 illustrated flowcharts expanding various logic phases illustrated in FIG. 4 and for learning distances for a subject domain.

Overall Architecture and Process Flow of Visual Interactive Search System

In an implementation of the present disclosure, a system can have several aspects, and different implementation need not implement all of the following aspects: 1) a module for creating an initial query, 2) a module for obtaining a set of candidate results satisfying the initial query, 3) a module for determining the distance or similarity between candidate results or a module for embedding the candidate results in a vector space, 4) a module for sub-selecting a discriminating set of candidate results, 5) a module for arranging candidate results in 2 dimensions, 6) a module for obtaining user input with regard to the candidate results, 7) a module for refining the search query to incorporate information regarding the user input encoded as geometric or distance constraints with respect to the embedding or distance measures of 3, and 8) a module for iteratively obtaining a set of candidate results satisfying the initial query and the geometric or distance constraints accumulated from user input.

Figure 1:
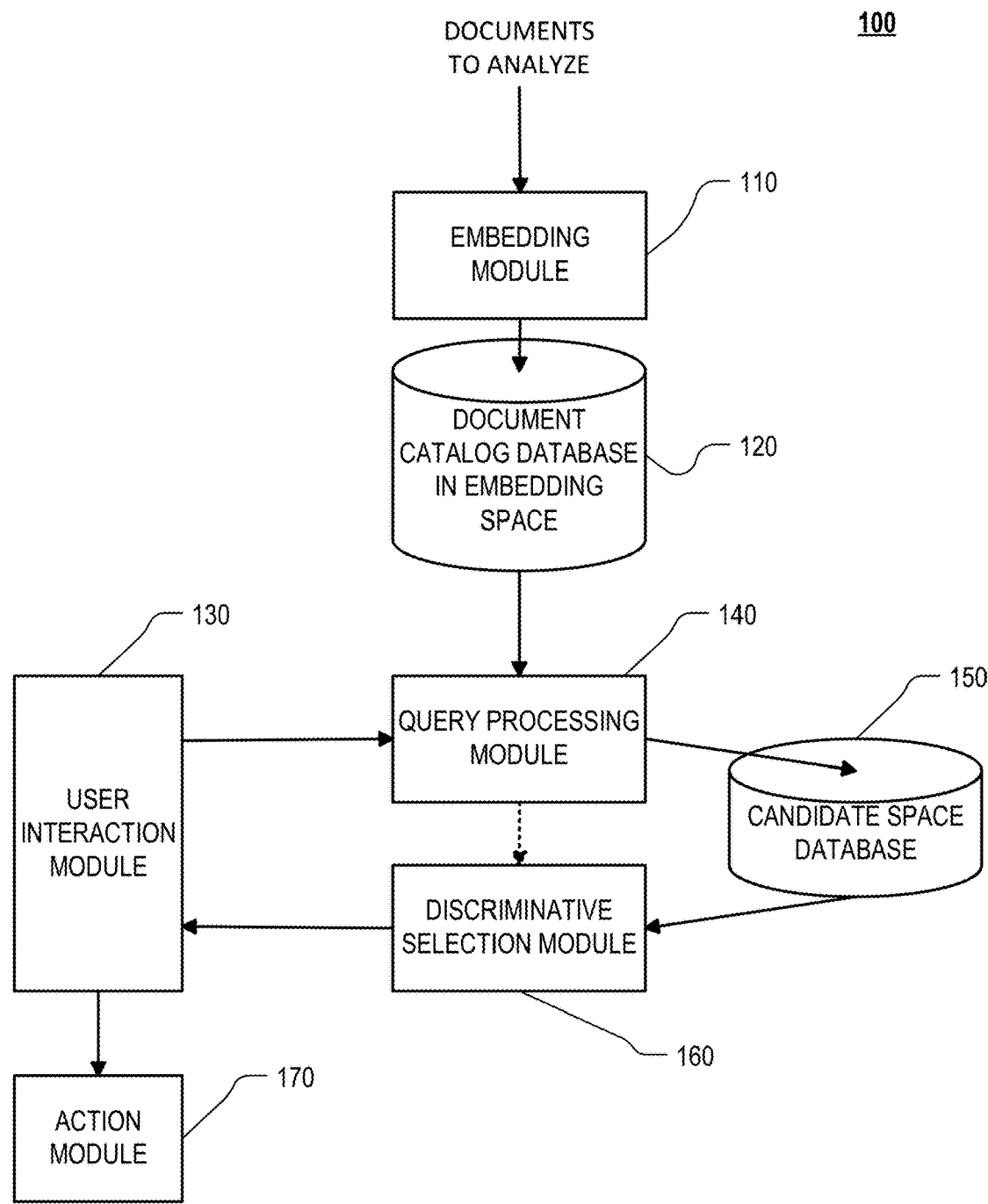
FIG. 1 is a block diagram of various components of a visual interactive search system according to an implementation of the present disclosure.

FIG. 1 is a block diagram of various components of an of a visual interactive search system according to an implementation of the present disclosure.

Referring to FIG. 1, a block diagram 100 of a visual interactive search system includes an embedding module 110 which calculates an embedding of source documents into an embedding space, and writes embedding information, in association with an identification of the documents, into a document catalog database (e.g., document catalog) 120. A user interaction module 130 receives queries and query refinement input (such as relevance feedback) from a user, and provides the received queries and query refinement input to a query processing module 140. In an implementation, the user interaction module 130 includes a computer terminal, whereas in another implementation the user interaction module 130 includes only certain network connection components through which the system communicates with an external computer terminal. The query processing module 140 interprets the queries as geometric constraints on the embedding space, and narrows or otherwise modifies a catalog of documents obtained from the embedding space to develop a set of candidate documents which satisfy the geometric constraints. These candidate documents are written into a candidate space database 150. Candidate spaces as used herein are also embedding spaces, and for example may constitute a portion of the embedding space of the document catalog database 120.

In some implementations, the query processing module 140 may also perform a re-embedding of the candidate documents in embedding space. A discriminative selection module 160 then selects a discriminative set of the documents from the candidate space database 150 and presents the discriminative set of the documents to the user via the user interaction module 130. The user interaction module 130 may then receive further refinement queries from the user, which are handled as above, or the user interaction module 130 may receive a user commit indication, in which case the system takes some action using an action module 170 with respect to the user's selected document. The action taken by the action module 170 could be opening a document for the user, engaging in further search refinement, processing the user's selected document as an order for a product represented by the document, processing the user's selected document as an order for delivery of a digital product represented by the document, processing the user's selected document as an order for a product represented by the document to be manufactured and shipped, or processing the user's selected document as a request for sharing with others digital content represented by the document.

In some implementations the user refinement input may not require a further geometric constraint on the candidate space database 150, but rather may involve only selection of a different discriminative set of documents from the existing candidate space database 150 for presentation to the user. Also, in various implementations, the candidate space database may not be implemented as a separate database, but rather may be combined in various ways with the document catalog database 120. The candidate space database 150 may also be implied rather than physical in some implementations.

FIG. 2 illustrates a visual interactive search system according to an implementation of the present disclosure.

Referring to FIG. 2, a system 200 includes a user computer 210 and a server computer 212, connected to each other via a network 214 such as the Internet. The server computer 212 has accessibly thereto the document catalog database 120 (as also illustrated in FIG. 1) identifying documents in association with embedding information, such as relative distances and/or positions of the documents in a vector space. The user computer 210 also in various implementations may or may not have accessibly thereto a document catalog database 218 identifying the same information as identified in the document catalog database 120.

Initially, the embedding module 110 (as also illustrated in FIG. 1), which may for example be the server computer 212 or a separate computer system or a process running on such a computer, analyzes a catalog of documents to extract embedding information about the documents. For example, if the documents are photographs, the embedding module 110 may include a neural network and may use deep learning to derive embedding image information from the photographs.

Alternatively, the embedding module 110 may derive a library of image classifications (axes on which a given photograph may be placed), each in association with an algorithm for recognizing in a given photograph whether (or with what probability) the given photograph satisfies that classification. Then the embedding module 110 may apply its pre-developed library to a smaller set of newly provided photographs, such as the photos currently on the user computer 210, in order to determine embedding information applicable to each photograph. Either way, the embedding module 110 writes into the document catalog database 120 the identifications of the catalog of documents that the user may search, each in association with the corresponding embedding information.

In yet another implementation, the embedding information that the embedding module 110 writes into document catalog database 120 may be provided from an external source, or entered manually.

The iterative identification steps described above can be implemented in a number of different ways. In one implementation, all computation takes place on the server computer 212, as the user iteratively searches for a desired document. For example, the operations of the query processing module 140 and the discriminative selection module 160 may take place on the server computer 212. The user, operating the user computer 210, sees all results only by way of a browser. In this implementation, it is not necessary that the user computer 210 have the document catalog database 218 accessibly thereto. In another implementation, the server computer 212 transmits its entire document catalog database 120 or a subset of thereof to the user computer 210. The user computer 210 can write the document catalog database 120 or the subset thereof into its own document catalog database 218. All computation takes place on the user computer 210 in such an implementation, as the user iteratively searches for a desired document. Many other arrangements are possible as well.

FIG. 3 is a block diagram of a user computer and/or a server computer, as illustrated in FIG. 2, that can be used to implement software incorporating aspects of the visual interactive search system according to an implementation of the present disclosure.

The diagram of FIG. 3 may also generally represent any device discussed in the present disclosure and/or illustrated in any of the figures. When referring to the user computer 210 with reference to FIG. 3, the present disclosure may also be references the server computer 212 or any other type of computer and/or computer system disclosed herein. Further, any of the method, logic steps or modules for carrying out specified operations as discussed in the present disclosure or as illustrated in the figures may be carried out using the some or all of the components illustrated in FIG. 3.

The user computer 210 typically includes a processor subsystem 314 which communicates with a number of peripheral devices via a bus subsystem 312. These peripheral devices may include a storage subsystem 324, including a memory subsystem 326 and a file storage subsystem 328, user interface input devices 322, user interface output devices 320, and a network interface subsystem 316. The user interface input devices 322 and the user interface output devices 320 allow user interaction with the user computer 210. The network interface subsystem 316 provides an interface to outside networks, including an interface to a communication network 318, and is coupled via the communication network 318 to corresponding interface devices in other computer systems. The communication network 318 may comprise many interconnected computer systems and communication links. These communication links may be wireline links, optical links, wireless links, or any other mechanisms for communication of information, but typically the communication network 318 is an internet protocol (IP)-based communication network. While in one implementation, the communication network 318 is the Internet, in other implementations, the communication network 318 may be any suitable computer network.

Physical hardware components of network interfaces (e.g., the network interface subsystem 316 and the communication network 318) are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

The user interface input devices 322 may include a keyboard, pointing devices such as a mouse, trackball, touchpad, or graphics tablet, a scanner, a touch screen incorporated into a display, audio input devices such as voice recognition systems, microphones, and other types of input devices. In general, use of the term "input device" is intended to include all possible types of devices and ways to input information into the user computer 210 or onto the communication network 318. It is by way of the user interface input devices 322 that the user provides queries and query refinements to the system.

The user interface output devices 320 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display via audio output devices. In general, use of the term "output device" is intended to include all possible types of devices and ways to output information from the user computer 210 to the user or to another machine or computer system. It is by way of the user interface output devices 320 that the system presents query result layouts toward the user.

The storage subsystem 324 stores the basic programming and data constructs that provide the functionality of certain implementations of the present disclosure. For example, the various software modules implementing the functionality of certain implementations of the present disclosure may be stored in the storage subsystem 324. These software modules are generally executed by the processor subsystem 314.

The memory subsystem 326 typically includes a number of memories including a main random access memory (RAM) 330 for storage of instructions and data during program execution and a read only memory (ROM) 332 in which fixed instructions are stored. File storage subsystem 328 provides persistent storage for program and data files, and may include a hard disk drive, a floppy disk drive along with associated removable media, a CD ROM drive, an optical drive, or removable media cartridges. Databases and modules implementing the functionality of certain implementations of the present disclosure may have been provided on a computer readable medium such as one or more CD-ROMs, and may be stored by the file storage subsystem 328. The memory subsystem 326 contains, among other things, computer instructions which, when executed by the processor subsystem 314, cause the computer system to operate or perform functions as described herein. As used herein, processes and software that are said to run in or on "the host" or "the computer," execute on the processor subsystem 314 in response to computer instructions and data in the memory subsystem 326 including any other local or remote storage for such instructions and data.

The user computer 210 itself can be of varying types including a personal computer, a portable computer, a workstation, a computer terminal, a network computer, a television, a mainframe, a server farm, or any other data processing system or user device. In particular, it is envisaged that the user computer 210 may be a hand-held device such as a tablet computer or a smart-phone. In another implementation, a "system" performs all the operations described herein, and the "system" can be implemented as a single computer or multiple computers with any desired allocation of operations among the different member computers. Due to the ever-changing nature of computers and networks, the description of the user computer 210 depicted in FIG. 3 is intended only as a specific example for purposes of illustrating the preferred implementations of the present disclosure. Many other configurations of the user computer 210 are possible having more or less components than the user computer depicted in FIG. 3.

FIG. 4 is a flowchart illustrating various logic phases through which a visual interactive search system may proceed according to an implementation of the present disclosure.

Referring to FIG. 4, the various logic phases generally include (i) embedding documents, which requires a defining of distances and similarities between the digital documents and database organization of the embedded digital documents, (ii) an implementation of an initial query to identify an initial candidate space, (iii) selecting an initial collection of documents to present to the user, (iv) an identification of candidate results in dependence on user input, (v) obtaining a discriminative result set in dependence on the user input, (vi) presenting results to the user, and (vii) obtaining user input for further refinement.

Embedding of the Documents

Initially, in operation 410, a catalog of digital documents (e.g., images, text, web-pages, catalog entries, sections of documents, etc.) is embedded in an embedding space and stored in a database. Though this group of documents may be referred to herein as a "catalog," the use of that term is not intended to restricted the group to documents that might be found in the type of catalog that a retail store might provide. In the database, a distance is identified between each pair of the documents in the embedding space corresponding to a predetermined measure of dissimilarity between the pair of documents. Specific implementations of embedding documents are further illustrated in FIGS. 8-13B, discussed below.

The "embedding space," into which (digital) documents are embedded by the embedding module 110 (see FIGS. 1 and 2) as described in operation 410, can be a geometric space within which documents are represented. In one implementation the embedding space can be a vector space and in another implementation the embedding space can be a metric space. In a vector space, the features of a document define its "position" in the vector space relative to an origin. The position is typically represented as a vector from the origin to the document's position, and the space has a number of dimensions based on the number of coordinates in the vector. Vector spaces deal with vectors and the operations that may be performed on those vectors.

When the embedding space is a metric space, the embedding space does not have a concept of position, dimensions or an origin. Distances among documents in a metric space are maintained relative to each other, rather than relative to any particular origin, as in a vector space. Metric spaces deal with objects combined with a distance between those objects and the operations that may be performed on those objects.

For purposes of the present disclosure, these objects are significant in that many efficient algorithms exist that operate on vector spaces and metric spaces. For example metric trees may be used to rapidly identify objects that are "close" to each other. Objects can be embedded into vector spaces and/or metric spaces. In the context of a vector space this means that a function can be defined that maps objects to vectors in some vector space. In the context of a metric space it means that it is possible to define a metric (or distance) between those objects, which allows the set of all such objects to be treated as a metric space. Vector spaces allow the use of a variety of standard measures of distance (divergence) including the Euclidean distance. Other implementations can use other types of embedding spaces.

As used herein, "an embedding" is a map which maps documents into an embedding space. Typically an embedding is a function which takes, as inputs, a potentially large number of characteristics of the document to be embedded. For some embeddings, the mapping can be created and understood by a human, whereas for other embeddings the mapping can be very complex and non-intuitive. In many implementations the latter type of mapping is developed by a machine learning algorithm based on training examples, rather than being programmed explicitly.

In order to embed a document catalog in a vector space each document must be associated with a vector. A distance between two documents in such a space is then determined using standard measures of distance using vectors.

A goal of embedding documents in a vector space is to place intuitively similar documents close to each other. There are many ways to achieve this. For example a common way of embedding text documents is to use a bag-of-words model. The bag of words model maintains a dictionary. Each word in the dictionary is given an integer index, for example, the word aardvark may be given the index 1, and the word zebra may be given the index 60,000. Each document is processed by counting the number of occurrences of each dictionary word in that document. A vector is created where the value at the $i^{th}$ index is the count for the $i^{th}$ dictionary word. Variants of this representation normalize the counts in various ways. Such an embedding captures information about the content and therefor the meaning of the documents. Text documents with similar word distributions are close to each other in this embedded space.

There are many other possibilities by which documents may be embedded into a vector space. For example images may be processed to identify commonly occurring features using, e.g., scale invariant feature transforms (SIFT), which are then binned and used in a representation similar to the bag-of-words embedding described above. Further, embeddings can be created using deep neural networks, or other deep learning techniques. For example a neural network can learn an appropriate embedding by performing gradient descent against a measure of dimensionality reduction on a large set of training data. As another example, a Kernel can be learned based on data and derive a distance based on that Kernel. Likewise distances may be learned directly. These approaches generally use large neural networks to map documents, words, or images to high dimensional vectors (for example see: A brief introduction to kernel classifiers, Mark Johnson, Brown University 2009, "Using Confidence Bounds for Exploitation-Exploration Trade-offs, available on the internet at cs (dot) brown (dot) edu/courses/cs195-5/fall2009/docs/lecture_10-27.pdf, and incorporated herein by reference; and Kernel Method for General Pattern Analysis, Nello Cristianini, University of California, Davis, accessed October 2016 on the internet at www (dot) kernel-methods (dot) net/tutorials/KMtalk.pdf, and incorporated herein by reference).

In other implementations, an embedding can be learned using examples with algorithms such as Multi-Dimensional Scaling, or Stochastic Neighbor Embedding. An embedding into a vector space may also be defined implicitly via a Kernel. In this case the explicit vectors may never be generated or used, rather the operations in the vector space are carried out by performing Kernel operations in the original space.

Other types of embeddings of particular interest capture date and time information regarding the document, e.g., the date and time when a photograph was taken. In such cases a Kernel may be used that positions images closer if they were taken on the same day of the week in different weeks, or in the same month but different years. For example, photographs taken around Christmas may be considered similar even though they were taken in different years and so have a large absolute difference in their timestamps. In general, such Kernels may capture information beyond that available by simply looking at the difference between timestamps.

Similarly, embeddings capturing geographic information may be of interest. Such embeddings may consider geographic meta-data associated with documents, e.g., the geo-tag associated with a photograph. In these cases a Kernel or embedding may be used that captures more information than simply the difference in miles between two locations. For example, it may capture whether the photographs were taken in the same city, the same building, or the same country.

Often embeddings will consider documents in multiple ways. For example, a product may be embedded in terms of the meta-data associated with that product, the image of that product, and the textual content of reviews for that product. Such an embedding may be achieved by developing Kernels for each aspect of the document and combining those Kernels in some way, e.g., via a linear combination.

In many cases a very high dimensional space would be required to capture the intuitive relationships between documents. In some of these cases the required dimensionality may be reduced by choosing to embed the documents on a manifold (curved surface) in the space rather than to arbitrary locations.

Different embeddings may be appropriate on different subsets of the document catalog. For example, it may be most effective to re-embed the candidate result sets at each iteration of the search procedure. In this way the subset may be re-embedded to capture the most important axes of variation or of interest in that subset.

To embed a document catalog in a metric space requires associating that catalog with a distance (or metric).

Distances Between Digital Documents

A "distance" between two documents in an embedding space corresponds to a predetermined measurement (measure) of dissimilarity among documents. Preferably it is a monotonic function of the measurement of dissimilarity. Typically the distance equals the measurement of dissimilarity. Example distances include the Manhattan distance, the Euclidean distance, and the Hamming distance.

Given the distance (dissimilarity measure) between documents to be searched, or the embedding of those documents into a vector space, a metric space or a manifold there are a variety of data structures that may be used to index the document catalog and hence allow for rapid search. Such data structures include metric trees, kd-trees, R-trees, universal B-trees, X-trees, ball trees, locality sensitive hashes, and inverted indexes. The system can use a combination of such data structures to identify a next set of candidate results based on a refined query. An advantage of using geometric constraints is that they may be used with such efficient data structures to identify next results in time that is sub-linear in the size of the catalog.

There are a wide variety ways to measure the distance (or dissimilarity) between documents, and these may be combined to produce new measures of distance. An important concept is that the intuitive relationships between digital documents may be captured via such a similarity or distance measure. For example, some useful distance measures place images containing the same person in the same place close to each other. Likewise, some useful measures place documents discussing the same topic close to each other. Of course there are many axes along which digital documents may be intuitively related, so that the set of all documents close (with respect to that distance) to a given document may be quite diverse. For example, a historical text describing the relationship between Anthony and Cleopatra may be similar to other historical texts, texts about Egypt, texts about Rome, movies about Anthony and Cleopatra, and love stories. Each of these types of differences constitutes a different axis relative to the original historical text.

Such distances may be defined in a variety of ways. One typical way is via embeddings into a vector space. Other ways include encoding the similarity via a Kernel. By associating a set of documents with a distance we are effectively embedding those documents into a metric space. Documents that are intuitively similar will be close in this metric space while those that are intuitively dissimilar will be far apart. Note further that Kernels and distance functions may be learned. In fact, it may be useful to learn new distance functions on subsets of the documents at each iteration of the search procedure.

Note that wherever a distance is used to measure the dissimilarity between documents a Kernel may be used to measure the similarity between documents instead and vice-versa. In particular, in the sequel we will refer to the use of distances, e.g., in the definition of constraints. However, Kernels may be used directly instead without the need to transform them into distances.

Kernels and distances may be combined in a variety of ways. In this way multiple Kernels or distances may be leveraged. Each Kernel may capture different information about a document, e.g., one Kernel may capture visual information about a piece of jewelry, while another captures price, and another captures brand.

Also note that embeddings may be specific to a given domain, such as a given catalog of products or type of content. For example, it may be appropriate to learn or develop an embedding specific to men's shoes. Such an embedding would capture the similarity between men's shoes be would be uninformative with regard to men's shirts.

Database Organization

The databases used in an implementation of the present disclosure, such as databases 120 and 150 as illustrated in FIG. 1, may use commonly available means to store the data in, e.g., a relational database, a document store, a key value store, or other related technologies. In each case the original document contents (or pointers to them) may be stored and associated with their high dimensional representation, or a set of measures of distance relative to other documents.

In order to achieve scalable and fast search performance indexing structures are critical. When documents are embedded in a vector space indexes may be built using, e.g., kd-trees. When documents are associated with a distance metric and hence embedded in metric space metric trees may be used.

The databases described herein are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein.

Initial Query

Referring to FIG. 4, in operation 412 an initial query is optionally processed to yield an initial candidate space of documents satisfying the query results. The initial query may be a conventional text query, for example. The initial candidate space is within and optionally smaller than the full catalog of documents.

The initial query presented may be created and evaluated using a variety of standard techniques. For example, the initial query may be presented as a set of keywords entered via a keyboard or via speech, the initial query may be a natural language phrase, or sentence entered via a keyboard or via speech, or the initial query may be an audio signal, an image, a video, or a piece of text representing a prototype for which similar audio signals, images, videos, or text may be sought. A variety of means are known by which such an initial query may be efficiently evaluated, e.g., searching a relational database, or using an inverted index. The initial query may also be designed to simply return a random set of results or the initial query may be empty such that it imposes no constraints.

Other interfaces for initial queries allow for faceted search. A faceted search provides a means for users to constrain a search along a set of axes. For example, the faceted search might provide a slider that allows users to constrain the range of acceptable prices.

The search constraints created from the initial query (as well as subsequent user input) can be used to identify a set of candidate results. This may be achieved using a variety of means. For example, the initial query may be performed against a relational database whereby the results are then embedded in a vector or metric space. These results may then be indexed using, e.g., a kd-tree or a metric tree and searched to identify candidates that satisfy both the initial query and the constraints. Alternatively, the initial query may also be converted to geometric constraints that are applied to the set of embedded documents. For example, the geometric representation of the constraints implied both by the initial query and the user input are combined and an appropriate index is used to identify embedded documents satisfying both sets of constraints. Geometric constraints are discussed in more detail below with reference to operation 418.

Selection of Initial Collection of Documents

In operation 413 the initial collection of digital documents is derived from the initial candidate space. This initial collection of documents is a subset of the initial candidate space. As used herein, the term "subset" refers only to a "proper" subset. The initial candidate space is sometimes referred to herein as an "i=0" candidate space, for convenient description hereinafter of the iterative search process. Similarly, the initial collection of documents is sometimes referred to herein as an "i=0" collection. In one implementation the initial collection of documents is selected as a discriminative subset of the catalog, while in another implementation the initial collection of documents is not discriminative.

For many purposes, such as allowing a user to browse visually through a catalog of products, it is desirable that the initial collection of documents presented to the user from the initial candidate space is such that the visual interactive search system can learn as much information as possible from the user's initial selection. This objective can be formulated as a trade-off between two sub-objectives. First, each of the documents shown in the initial collection should be as representative as possible of some subset of the content of the catalog (generally implementing an "exploitation" sub-objective as described throughout the present disclosure). Second, the documents shown in the initial collection should be maximally diverse (a preferred implementation of an "exploration" sub-objective as described throughout the present disclosure). In this second sub-objective, in order to learn about the user's preferences, it is desirable for the initial collection to represent as many axes of variation of the documents in the catalog as possible. For a product catalog, such axes of variation may include size, shape, color, features, and so on.

The following algorithm implements the above twin objectives of representativeness and diversity by adding documents from the catalog to the initial collection iteratively. The algorithm implements the above twin objectives by evaluating a cost function for each of the documents remaining in the catalog after each round in the iteration, and choosing the least cost document at each round. As used herein, maximizing a benefit function is the same as minimizing a cost function. The cost function has one term which indicates the degree to which a candidate document is representative of documents which are nearby in the embedding space (greater representativeness favors lower cost), and a second term which indicates the extent to which the candidate document is diverse from those already chosen for the initial collection (greater diversity favors lower cost). The two terms are weighted to implement a desired trade-off between the two objectives of representativeness (exploitation) and diversity (exploration).

In the following pseudocode, which is an example implementation of the algorithm:

n is the number of documents in the catalog (or a subset of the catalog or the initial candidate space);

$X_i$ is a feature vector corresponding to the i'th document in the catalog or the initial candidate space, where the feature vector includes information for a determined number of features related to i'th document (since the feature vector for a document captures the information about it that we will use in our analysis, we will sometimes regard a document and its feature vector as equivalent. For example, the variable $X_i$ refers herein to both the i'th document and the feature vector for the i'th document. Similarly, we sometimes refer to the distance "between a pair of documents", as a shorthand to mean the distance between their feature vectors);

p is the dimensionality of the embedding space (and the number of elements in each feature vector);

k is the number of documents to be included in the first collection to be presented to the user;

τ is a rank threshold, used in the cost function as described below;

r is a remove count, indicating the quantity of nearby candidate documents to remove at each round of the iteration;

α is a weighting parameter, which is greater than zero;

$X_1, X_2, \ldots, X_n$ are the feature vectors for a catalog of n documents (products); and $d(X_i, X_j)$ is the distance in the embedding space between the feature vectors for documents $X_i$ and $X_j$, according to a predetermined measure of distance. For example, this distance can be computed as the Euclidean distance between the documents, or a kernelized distance, depending on the particular implementation.

The pseudocode includes:

```
collection = empty set. (This will ultimately be the initial collection to be
presented to the user, which is built incrementally.)
candidates = X₁, X₂, ... , Xₙ
for ( i from 1 to k ) {
    compute cost score for each document in 'candidates' (see cost
    function below);
    add to 'collection' the document from 'candidates' with a minimum
    cost (e.g., a lowest cost score);
    remove from 'candidates' the document just added to 'collection' and
    the r documents which are closest to that document in the embedding
    space
}
```

Thus, the initial collection of documents to be offered to the user starts out empty, and documents are added to it one at a time during the iteration, until k documents have been added. In each round of the iteration, a cost is computed for each of the documents in the catalog, other than for those documents that have already been removed in prior rounds of the iteration. The re-computation each round accommodates the observation that the cost (cost score) of a document may not remain constant after some other documents have been removed from the candidate set. In other implementations, the costs are computed once for the entire iteration, or the costs are recomputed for some but not all of the iteration rounds, or for some or all of the initial and iteration rounds, the cost score for some documents is left uncomputed or unchanged from the prior round. The document with the lowest computed cost is then moved to the initial collection, and a number 'r' of documents which are near that document (according to the predetermined definition of distance) are removed from the candidate set. The removal of such documents acknowledges that a selected document is supposed to be representative of all the documents in a region of the embedding space, so it will not be useful to display two which are representative of the same region. In another implementation, the removal step can be omitted.

A pseudocode implementation of the cost function includes:

```
ComputeCost(document X, candidates, collection) {
    Xt = τ'th closest document to document X in 'candidates', where τ is
    a parameter of the algorithm
```

$$\text{cost} = d(X, X_t) - \alpha \frac{\Sigma_{X_j \in collection} d(X, X_j)}{\text{count(collection)}}$$

```
}
```

According to the cost function, the larger the value of α, the more weight is given to the diversity objective.

The first term in the cost function above, $d(X, X_t)$, describes a distance in an embedding space between the candidate document then under consideration (document X), and the document $X_t$ in the remaining candidate space which is the τ'th closest to document X. If τ=10, for example, $d(X,X_t)$ is the distance (according to the predetermined measure of distance) between document X and the document which is the $10^{th}$ closest to X. In one implementation, τ=r=n/(k+1).

Thus, this first term is a measure of the degree to which candidate document X is representative of documents which are nearby in the embedding space: if the distance to the τ'th nearest document is large, then X is not very representative of the region, and therefore is given a higher cost. In another implementation, a different measure can be used to favor representativeness. For example, in one variation, representativeness of a document X can be measured by the number of documents that are contained within a fixed radius of X in the embedding space.

The second term, $$\frac{\sum_{X_j \in collection} d(X, X_j)}{\text{count(collection)}},$$

measures the average distance of X to the various documents already in the initial collection. Thus, the second term is a measure of the extent to which the candidate document X is diverse from those already chosen for the initial collection. For example, if this average distance is large, then X is significantly diverse from those already in the initial set. The second term is subtracted from the first term in the cost function above, so such greater diversity yields a lower cost.

In another implementation, a different measure can be used to favor diversity. For example, in one variation, diversity from a set of documents can be measured as the sum of the eigenvalues of the covariance matrix of the embeddings of these documents. The more diverse the documents are, the larger the sum.

Maximizing diversity can also be done by maximizing the diversity of each candidate, which is measured by the norm of the 0-meaned embedding vector of the candidate. That is, $$\text{cost}=d(X,X_t)-\alpha\|X_{0\text{-}meaned}\|_{L2},$$

where $\|X_{0\text{-}meaned}\|_{L2}$ is the square root of the sum of the squares of the 0-meaned values of the elements in feature vector X. The 0-meaned values of the elements in feature vector X is X-mean (X).

In another variation, diversity of a document X (e.g., the document being scored) from those already in the initial collection can be measured using a K-medoids algorithm. Given a cluster C, the cost of a candidate document c is evaluated the following way:

$$\text{cost}(C, c) = \sum_{X_i \in C} d(X_i, c)$$

For K-medoids with centered norm variance term, the cost can be computed as:

$$\text{cost}(C, c) = \sum_{X_i \in C} d(X_i, c) - \alpha\|X_{centered}\|_{L2}$$

And for K-medoids with mean distance term, the cost can be computed, for a current set of medoids, as:

$$\text{cost}(C, c) = \sum_{X_i \in C} d(X_i, c) - \alpha \frac{\sum_{X_j \in \text{medoids}} d(X, X_j)}{\text{count}(\text{medoids})}$$

Other variations will be apparent to a person of ordinary skill in the present technology. Further, versions of the cost functions described above can be used without the iteration. For example, the costs can be computed once for all the documents in the catalog, using a cost function such as one of those set forth above, and where the k lowest cost documents define the initial candidate set. No iteration needs to be performed in such an implementation since, for example, the costs can be computed in parallel.

It will be appreciated that while the formulas set forth herein describe certain principles, such formulas could be written in many different forms and still describe the same principles. Thus in a particular implementation of the technology disclosed for which the formulas are written in a different form, those formulas can still be re-written in the form described herein, because they still describe the same principles. As used herein, a particular formula "can be written" or "can be re-written" in a form set forth herein if and only if the particular formula is mathematically equivalent to the formula in the form set forth herein.

The following document is incorporated herein by reference for its additional teachings and for any suggestions it contains about additional implementations: Johnson, D. S., "Approximation algorithms for combinatorial problems", J. Comput. System Sci. 9, 256-278 (1974).

Turning back to FIG. 4, in operation 414, the initial collection of documents is identified toward the user. In one implementation this operation can include displaying a representation of the documents in the initial collection visibly to the user.

Iterative Search

In operation 415 an iterative search process is begun. For convenience of description, the iterations are numbered herein consecutively beginning with iteration 1, and in general each iteration is iteration number 'i'. Reference is sometimes made to a 0'th iteration, which refers to the i=0 candidate space and the i=0 collection of documents.

Before the beginning of the i'th iteration, the user is presented with a collection of documents from the prior iteration (i-1). If i=1, then this collection of documents is the initial (i=0) collection of documents from operation 414. If i>1, then this collection of documents is the (i-1)'th collection of documents as presented to the user in operation 423 of the prior iteration.

User Feedback, Geometric Constraints and Discriminative Result Set

At the beginning of the i'th iteration, in operation 416, the user provides relative and/or categorical feedback as to the documents in the (i-1)'th collection of documents. Preferably the relative feedback takes the form of user selection of a subset of the documents from the (i-1)'th collection, where selection of a document implies that the user considers that document to be more relevant to a search target than unselected documents from the (i-1)'th collection. The selected subset in the i'th iteration is referred to herein as the i'th selected subset, and those documents from the (i-1)'th collection which were not selected are sometimes referred to herein collectively as the i'th non-selected subset. Relative feedback and categorical feedback both can be considered forms of "relevance feedback."

In operation 418, a set of geometric constraints is derived from the relative feedback, in a manner described elsewhere herein. The set of geometric constraints derived in the i'th iteration is referred to as the i'th set of geometric constraints.

In operation 420, the i'th set of geometric constraints is applied to the embedding space to form an i'th candidate space, and in operation 422 an i'th collection of candidate documents is selected as a subset of the documents in the i'th candidate space. In one implementation the i'th collection of documents is selected as a discriminative subset of the i'th candidate space, while in another implementation the i'th collection of documents is not discriminative.

As used herein, a "geometric constraint" applied to an embedding space is a constraint that is described formulaically in the embedding space, rather than only by cataloguing individual documents or document features to include or exclude. Preferably the geometric constraint is defined based on distance (or similarity) to at least two documents that the user has seen. For example, such a constraint might be expressed as, "all documents which are more similar to document A than to document B."

In a vector embedding space, for example, the constraint can be described in the form of a specified function which defines a hypersurface. Documents on one side of the hypersurface satisfy the constraint whereas documents on the other side do not. A hyperplane may be defined in terms of dot products or Kernels and requires that $k(x,z)>0$ for a fixed vector x and a candidate z. Likewise a conic constraint may require that $k(x,z)>c$ for some constant c. In a metric embedding space, the constraint can be described in the form of a function of, for example, distances between documents. Thus in a metric embedding space, a geometric constraint might take the form of 'all documents within a specified distance from document X', for example, or 'all documents whose distance to document A is less than its distance to document B'. In one implementation, a hyperplane defined for a metric space takes the form of an "m-hyperplane," which, as used herein, is defined by two points a and b in the metric space as follows:

An m-hyperplane specified by the points a and b partitions a metric space (X, d) into two sets A and B where:
A={x: x in X such that $d(a,x)<=e*d(a,b)*d(b,x)+f*d(b,x)+h*d(a,b)+i$}
B=X\A Where e, f, g, h, and i are real valued constants which are not all equal to zero.

The geometric constraint is considered satisfied for only those documents which are located in a specified one of the partitions A or B of the metric space.

Geometric constraints also may be combined using set operations, e.g., union, intersection to define more complex geometric constraints. They also may be created by taking transformations of any of the example constraints discussed. For example, a polynomial function of distances, e.g., $d(x,z)*d(x,z)+d(y,z)<d(w, z)$ for given documents x, y, and w can be used, where only those documents z which satisfy the function are considered to satisfy the geometric constraint.

Kernels may be used independently of distances and constraints may be expressed directly in terms of Kernels, polynomials of Kernels, transformations of Kernels, or combinations of Kernels.

In an implementation, each iteration of a user search sequence identifies a new constraint, and the result set at that iteration is defined by the combined effect of all the constraints. For example if a constraint is represented as a hypersurface, where only those candidates on side A of the hypersurface are considered to satisfy the constraint, then the result set at a given iteration might be considered to be all those candidate documents which are within the intersection of the sides A of all the constraint hypersurfaces.

In various implementations, constraints (either as indicated by the user or as converted to geometric constraints) may be "hard" or "soft." Hard constraints are those which must be satisfied in the sense that solutions must satisfy the conditions of all hard constraints. Soft constraints are those which need not be satisfied but candidate solutions may be penalized for each soft constraint that they don't satisfy. Solutions may be rejected in a particular implementation if the accumulation of such penalties is too large. Constraints may be relaxed in some implementations, for example hard constraints may be converted to soft constraints by associating them with a penalty, and soft constraints may have their penalties reduced.

One way in which geometric constraints may be represented is to maintain a list of all unordered pairs of documents. Each entry in the list would be a pair (a,b), where a represents one document and b represents another document. The pair (b,a) may also appear in the list. Each entry is understood to mean that a candidate must be closer to the first element than to the second element in the pair. Thus, the two elements of the pair are sometimes referred to herein as "anchor documents." For example, given document c, the pair (a,b) would be associated with the constraint $d(a,c)<d(b,c)$. A real number can be associated with each pair. In the hard constraint case that number could be 0 or 1 with a 1 meaning that constraint must be satisfied and a 0 meaning that it does not need to be satisfied. Alternatively, in the soft constraint case the number could be any real number representing the penalty associated with breaking that constraint. This information could be maintained in other ways, e.g., using sparse representations. One alternative would be to maintain only those pairs associated with non-zero real numbers.

The goal of each set of geometric constraints derived in operation 418 from the user's relative feedback is to further narrow or modify the prior candidate space so as to form a new candidate space which better approaches the user's desired target. At each iteration, the information that the system has about the user's desired target is provided in the form of the user's relative feedback, which is provided in the form of a selection of documents. In general, therefore, each i'th set of geometric constraints identifies an i'th candidate space such that, according to some predefined definition of collective closeness, the documents in the i'th candidate space are collectively closer in the embedding space to the documents in the i'th selected subset, than are the documents in the (i−1)'th candidate space. This means that the predefined definition of collective closeness is defined such that, at a minimum, a candidate document X is considered closer to a document A than to a document B if in the embedding space, $d(A,X)<d(B,X)$.

For one implementation in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if the fraction of the documents in the given candidate space which are closer in the embedding space to the farthest document in the given selected subset than to the nearest document in the given non-selected subset, is greater than the fraction of the documents in the particular prior candidate space which are closer in the embedding space to the farthest document in the given selected subset than to the nearest document in the given non-selected subset.

For another implementation in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if the count, over all documents Y in the given candidate space and all pairs of documents (A,B), A in the i'th selected subset and B in the i'th non-selected subset, of instances in which $d(A,Y)<d(B,Y)$, is less than the count, over all documents X in the particular prior candidate space and all the pairs of documents (A,B), of instances in which $d(A,X)<d(B,X)$, each of the counts normalized for any difference between the total number of documents Y in the given candidate space and the total number of documents X in the particular prior candidate space.

For yet another implementation in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if the fraction of the documents Y in the given candidate space which are closer to the documents A in the i'th selected subset, averaged over all the documents A in the i'th selected subset, than they are to the documents B in the i'th non-selected subset, averaged over all the documents B in the i'th non-selected subset, is less than the fraction of the documents X in the particular prior candidate space which are closer to the documents A in the i'th selected subset, averaged over all the documents A in the i'th selected subset, than they are to the documents B in the i'th non-selected subset, averaged over all the documents B in the i'th non-selected subset. The term "an average," as used herein, includes both a mean and a median, and optionally includes weighting as well.

For still another implementation in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if an aggregation, over all documents Y in the given candidate space and all pairs of documents (A,B), A in the i'th selected subset and B in the i'th non-selected subset, of penalties associated with each instance in which $d(A,Y) \geq d(B,Y)$, is less than an aggregation, over all documents X in the particular prior candidate space and all the pairs of documents (A,B), of penalties associated with each instance in which $d(A,X) \geq d(B,X)$, where each instance in which $d(A,W) \geq d(B,W)$ is satisfied, for a given document W, is pre-associated with a respective penalty value. "Aggregation," or "aggregate," as used herein, includes sum, percentage, or other normalization, in which the further inclusion of an additional positive number does not decrease the total aggregate.

An advantage of working with geometric constraints is that, in an implementation, the memory and computational resources required to maintain and update the constraints depends on the number of constraints and not on the catalog size. This would, for example, allow constraint management to be performed and maintained on a mobile device such as a phone or tablet, rather than on a server.

Search queries may be ambiguous, or underspecified and so the documents satisfying a query may be quite diverse. For example, if the initial query is for a "red dress" the results may be quite varied in terms of their length, neckline, sleeves, etc. These operations of the present disclosure can be implemented to sub-select a discriminating set of results. Intuitively the objective is to provide a set of results to the user such that selection or de-selection of those results provides the most informative feedback or constraints to the search algorithm. These operations may be thought of as identifying an "informative" set of results, or a "diverse" set of results, or a "discriminating" set of results. The discriminative selection module 160, as illustrated in FIG. 1, may perform operation 418, to select a discriminative subset of results in any of a variety of ways.

In one implementation, a subset of the results may be discriminative as it provides a diversity of different kinds of feedback that the user can select. Diverse images may be selected as in, e.g., van Leuken, et al., "Visual Diversification of Image Search Results," in WWW '09 Proceedings of the 18th international conference on World wide web, pp. 341-350 (2009), incorporated by reference herein. This diverse set is selected in order to provide the user with a variety of ways in which to refine the query at the next iteration. There are a variety of ways in which such a set may be identified. For example, farthest first traversal may be performed which incrementally identifies the "most" diverse set of results. Farthest first traversal requires only a distance measure and does not require an embedding. Farthest first traversal may also be initialized with a set of results. Subsequent results are then the most different from that initial set.

Other means for selecting discriminative subsets of candidate results include using algorithms such as principal component analysis (PCA) or Kernel PCA to identify the key axes of variation in the complete set of results. The discriminative subset is then constructed to contain documents that lie at multiple points along those most discriminating axes.

Another means for selecting discriminative subsets of candidate results might use a clustering algorithm to select discriminative subsets of candidate results. Such a mechanism may use a clustering algorithm such as k-means, or k-medoids to identify clusters of similar documents within the candidate results. See http://en.wikipedia.org/wiki/K-means_clustering (visited 29 Apr. 2015) and http://en.wikipedia.org/wiki/K-medoids (visited 29 Apr. 2015), both incorporated by reference herein. One or more representative documents would then be selected from each cluster to yield the discriminative subset. In particular, when k-medoids is used the medoid of each cluster may be used as one of the representatives for that cluster.

Still another means might consider the set of constraints that would result from the user selecting or deselecting a given document. This set of constraints may be considered in terms of the candidate results it would yield. A discriminative subset may be selected so that the sets of candidate results produced by selecting any of the documents in that discriminative subset are as different as possible.

As used herein, "discriminativeness" of a particular set of documents in a group of documents is the least number of documents in the group that are excluded as a result of user selection of any document in the set. That is, if user selection of different documents in the particular set results in excluding different numbers of documents in the group, then the set's "discriminate veness" is considered herein to be the least of those numbers. Note that either the discriminative set of documents, or the formula by which user selection of a document determines which documents are to be excluded, or both, should be chosen such that the union of the set of documents excluded by selecting any of the documents in a discriminative set equals the entire group of documents.

Also as used herein, the "average discriminativeness" of a set of size n documents in a group of documents, is the average, over all sets of size n documents in the group of documents, of the discriminativeness of that set. Also as used herein, one particular set of documents can be "more discriminative" than another set of documents if the discriminativeness of the first set is greater than the discriminativeness of the second set.

Preferably the selection module 160, when performing operation 418, selects a set of N1>1 documents from the current candidate space database 150, which is more discriminative than the average discriminativeness of sets of size N1 documents in the candidate space. Even more preferably, selection module 160, when performing operation 418 selects a set which is at least as discriminative as 90% of, or in some implementations all of, other sets of size N1 documents in the current candidate space.

Not all implementations necessarily need to perform operation 418 of selecting a discriminative subset of candidates. In some implementations it is sufficient for the user interaction module 130 to present toward the user a subset of documents that are chosen randomly from the candidate set, or that are chosen in some other way. In such an implementation the discriminative selection module 160 is replaced with simply a selection module.

The selected subset may be chosen to balance discriminativeness with satisfying soft constraints. For example, if soft constraints are used then each document becomes associated with a penalty for each constraint it breaks. The selected subset may be chosen to trade-off the total penalties for all candidates in the selected subset, with the discriminativeness of that subset. In particular, the document with the smallest penalty may be preferentially included in the selected subset even if it reduces the discriminativeness.

In some cases, see below, constraints may be managed and updated using a machine learning algorithm. In particular, this may include active learning algorithms, or bandit algorithms. These algorithms identify "informative" (or discriminative) examples at each iteration. When these algorithms are used to manage constraints, their identification of informative examples may be used as the discriminative subset, or as the basis for determining the discriminative subset. Bandit algorithms are of particular interest as they seek to trade-off maximizing reward (i.e., finding the target document), with identifying discriminative examples.

Any of the above techniques for selecting a discriminative subset may also be used in the selection of an initial collection of candidate documents to be presented toward the user, either before or after the initial query Presenting Results to the User In operation 423 the i'th collection of documents (e.g., the results of operations 418 and 420) is presented toward the user for optional further refinement. These results may be identified as discriminative results, which are presented to the user.

In an implementation, an aim of the discriminative results presentation to the user in operation 420, by the user interaction module 130, is to provide the user with a framework in which to refine the query constraints.

For example the results may be presented as a two dimensional grid. Results should be placed on that grid in a way that allows the user to appreciate the underlying distances between those results (as defined using a distance measure or embedding). One way to do this would be to ensure that results that are far from each other with respect to the distance measure are also displayed far from each other on the grid. Another way would be to project the embedding space onto two dimensions for example using multidimensional scaling (MDS) (for example see: Jing Yang, et al., "Semantic Image Browser: Bridging Information Visualization with Automated Intelligent Image Analysis," Proc. IEEE Symposium on Visual Analytics Science and Technology (2006), incorporated herein by reference). Yet another way would be to sub-select axes in the embedding space and position results along those axes.

Other layouts contemplated include 2 dimensional organizations not on a grid (possibly including overlapping results), 3 dimensional organizations analogous to the 2 dimensional organizations. Multi-dimensional organizations analogous to the 2 and 3 dimensional organizations with the ability to rotate around one or more axes. In general an M-dimensional layout can be used, where M>1. In implementations in which the embedding space has dimensions, the number of dimensions in the presentation layout need not be the same as the number of dimensions in the embedding space. Yet other layouts include hierarchical organizations or graph based layouts.

The document placement in the layout space should be indicative of the relationship among the documents in embedding space. For example, the distance between documents in layout space should correspond (monotonically, if not linearly) with the distance between the same documents in embedding space. Also, if three documents are collinear in embedding space, advantageously they are placed collinearly in layout space as well. In particular, collinearity in layout space with a candidate document which the system identifies as the most likely target of the user's query (referred to herein as the primary candidate document) indicates collinearity in the embedding space with the primary candidate document.

It will be appreciated, however, that the embedding space typically has a very large number of dimensions, and in high dimensional spaces very few points are actually collinear. In an implementation, therefore, documents presented collinearly in layout space indicate only "substantial" collinearity in the embedding space. If the embedding space is such that each document has a position in the space (as for a vector space), then three documents are considered "substantially collinear" in embedding space if the largest angle of the triangle formed by the three documents in embedding space is greater than 160 degrees. If the embedding space is such that documents do not have a position in the embedding space, but they do have distances from each other (such as for a metric space), then as used herein, a group of three documents are considered collinear if the sum of the two smallest distances between pairs of the documents in the group in embedding space equals the largest distance between pairs of the documents in the group in embedding space. The three documents are considered "substantially collinear" if the sum of the two smallest distances exceeds the largest distance by no more than 10%. As used herein, "collinearity" and "substantial collinearity" do not include the trivial cases of coincidence or substantial coincidence.

User Input and Further Refinement of Query

In operation 424, a determination is made as to whether the user requests further refinement. If the user is satisfied with one of the candidate results (NO in operation 424), then the user essentially indicates to commit to that result and then in operation 426 the system takes action with respect to the user-selected document. If the user input indicates further refinement (YES in operation 424), then the logic returns to operation 415 for the next iteration of the search loop.

The user interaction module 130, as illustrated in FIG. 1, provides the user with a user interface (UI) which allows the user to provide input in a variety of ways. This UI can provide interactions with the user in operation 424, as well as operation 416 or any other operation that can benefit from the interaction of the user. The user may click on a single result to select it, or may swipe in the direction of a single result to de-select it. Similarly, the user may select or deselect multiple results at a time. For example, this may be done using a toggle selector on each result. The user might also implicitly select a set of results by swiping in the direction of a result indicating a desire for results that are more like that result "in that direction." In this case "in that direction" means that the differences between the primary result and the result being swiped should be magnified. That is, the next set of results should be more like the result being swiped and less like the "primary result." This concept may be generalized by allowing the user to swipe "from" one result "to" another result. In this case new results should be more like the "to" result and less like the "from" result.

Additionally, the UI can provide the user with the ability (e.g., via a double-click, or a pinch) to specify that the next set of results should be more like a specific result than any of the other results displayed. That is, the user selects one of the displayed results to indicate that that result is preferred over all other displayed results. This may then be encoded as a set of constraints indicating for each non-selected document that future candidates should be closer (in the embedding space) to the selected document than to that non-selected document. This form of feedback, in which the user selects documents to indicate they are "more relevant" than the non-selected documents to the user's desired goal, is sometimes referred to herein as "relative feedback." It is distinct from more traditional "categorical feedback," in which users are required to select candidates that are and are not relevant. However, in many cases relevant documents are so rare that there may be no such documents available for the user to select. Conversely, implementations of the system herein allow relative feedback where the user identifies more relevant candidates that may not actually be strictly relevant to the target, but still provide significant information to guide further searching. Relative feedback and categorical feedback both can be considered forms of "relevance feedback."

One way to encode relative feedback is as a set of geometric constraints on the embedding space. For each non-selected image B a constraint is created of the form $d(A,C)<d(B,C)$ where A is the selected image and C is the candidate image to which the constraint is applied (d is the distance in the embedding space). A candidate C then satisfies the constraint only if it satisfies $d(A,C)<d(B,C)$. In this way a single click generates multiple constraints. These constraints may be combined, e.g., such that the combined constraint is their intersection, and further candidate documents can be given a rank which is a monotonic function of the number of individual ones of the constraints that the candidate breaks (with smaller rank indicating greater similarity to the user's target).

Alternatively, the constraints may be used as soft constraints by associating each such constraint with a penalty. In this alternative further candidate documents can be given a rank which is a monotonic function of the sum total of the penalties associated with all of the individual constraints that the candidate breaks. In still further implementations the rank may be made dependent upon the age of a constraint (how early in the iterative search the constraint was imposed). This may be accomplished in one implementations by determining (or modifying) a penalty associated with each given constraint in dependence upon the iteration number in which the given constraint was first imposed. In one implementation the penalty may be designed to increase with the age of the constraint, whereas in another implementation the penalty may be designed to decrease with the age of the constraint.

This approach may be extended to allow the user to select multiple images that are more relevant. This feedback may be interpreted such that each of the selected images is more relevant than each of the non-selected images. In an implementation, the system might then create a different constraint corresponding to each pair of one selected document and one non-selected document. A total of P*Q constraints are created, where P is the number of selected documents and Q is the number of non-selected documents. The constraints may be of the form $d(A_i,C) < d(B_j,C)$, $i=1 \ldots P$ and $j=1 \ldots Q$.

The UI could provide the inverse ability, i.e., it may allow the user to select less relevant rather than more relevant images and the above description would be modified appropriately.

The UI can also provide the ability to specify that the next set of results should be like a particular selection but more diverse than the currently selected set of results.

Furthermore, the UI can provide the user with the ability to remove previously added constraints. In one implementation, a stack (or history) of constraints is maintained. The UI provides the user with the ability to remove constraints from the stack and hence remove constraints that were previously added. Even more particularly, when each piece of user feedback is provided as a single preferred image, i.e., the selected image is preferred over the non-selected images, the UI may display the sequence of selected images and allow the user to remove a single (previously selected image) and its associated constraints, or may allow the user to go back to a previous state by sequentially removing images (and their associated constraints) from the stack. This may be achieved with a "back button," or by displaying the stack on the user interface.

The UI may also provide the ability for the user to specify that a different set of similarly diverse images be provided. Further, the UI may also provide the ability for the user to provide multiple different kinds of feedback.

The system then incorporates the user's input to create a refined query, such as in operation 424, which loops back to operation 416. The refined query includes information regarding the initial query and information derived from the iterative sequence of refinements made by the user so far. This refined query may be represented as a set of geometric constraints that focus subsequent results within a region of the embedding space. Likewise, it may be represented as a set of distance constraints whose intersection defines the refined candidate set of results. It may also be represented as a path through the set of all possible results.

For example, the refined query may include constraints that require subsequent results to be within a specified distance of one of the selected candidate results. Or the refined query may include constraints that require subsequent results to be closer (with respect to the distance measure) to one candidate result than to another. These constraints are combined with the previously identified constraints in a variety of ways. For example, candidates may be required to satisfy all of these constraints, or may be required to satisfy a certain number of all constraints, or, in the case of soft constraints, they may be charged a penalty for each constraint they break.

Another way to manage constraints and refine the query is to use a machine learning algorithm, see below. Further, users may specify incompatible constraints. A system according to the present disclosure may have the ability to relax, tighten, remove, or modify constraints that it determines are inappropriate.

One way in which constraints may be relaxed or removed is with user feedback. In particular, the UI may provide a means for the user to remove previously added constraints, or to remove constraints from a history, i.e., to "go back."

Another way in which the system might relax or tighten constraints is in the context of soft constraints. In particular, if the geometric constraints are treated as soft constraints, i.e., a penalty is charged for each broken constraint, then these penalties may be different for each constraint. Specifically, older constraints may have smaller or larger penalties than newer constraints. Here newer constraints are those which were added in recent iterations, while older constraints are those which were added in earlier iterations. Wherever soft constraints are implemented with penalties, the candidate results may then be documents that have smaller total penalties summed over all such constraints. The candidate result set is then all documents whose total penalty is less than some predetermined value, or only the N documents having the smallest total penalty, where N is a predefined integer.

The geometric constraints may be updated and maintained using the machine learning algorithm, as mentioned above. In such implementations, the user's feedback is treated as training data to which the machine learning algorithm is applied, and the result of that application yields a model (also sometimes referred to herein as a hypothesis) of the user's desired target, that may in some cases be a geometric constraint. However, the resulting constraint is typically not expressed directly in terms of the user's feedback. That is, the resulting model does not explicitly test for the distances between candidate documents and documents for which the user has provided feedback, rather this relationship is indirect or implicit.

While many machine learning algorithms learn to classify documents into two or more classes, e.g., relevant or not relevant, some algorithms rank order documents according to their relevance. Examples of such algorithms include RankBoost (Freund, et al., "An Efficient Boosting Algorithm for Combining Preferences," Journal of Machine Learning Research 4 (2003) 37 pages), or the Ranking Perceptron (Collins, et al., "Convolution Kernels for Natural Language," in Advances in Neural Information Processing Systems, pp. 625-632 (2001)), both incorporated by reference herein. Such algorithms use feedback or training examples where only ordering information is provided. Specifically, they make use of training data where documents (examples) are not classified as relevant or irrelevant, but rather are rank ordered with respect to their relative relevance.

When viewed in the context of FIG. 4, rank order learning algorithms sometimes refer to the geometric constraints developed in operation 414 as a "hypothesis" or "model." Thus in the case of rank order learning algorithms, the development of geometric constraints in operation 414 involves training or updating the current hypothesis or model based on the user feedback combined with the feedback from previous iterations. The subset of candidates presented toward the user in operations 420-423 typically would be some limited number of the highest ranking documents based on the current hypothesis. This would not necessarily be a "discriminative" subset. However, some learning algorithms also naturally identify informative or discriminative documents as part of their process of hypothesis development. These are typically documents that when labeled as relevant or irrelevant and added to the training set will most improve the model. For these kinds of learning algorithms, operation 418 may select a discriminative subset merely involves selecting the documents already identified naturally in operation 416, and the subset of candidates presented toward the user in operation 423 is indeed discriminative.

One approach to the use of machine learning algorithms to update and maintain geometric constraints is to use a classification algorithms such as Support Vector Machines (e.g. Tong, et al., "Support Vector Machine Active Learning for Image Retrieval," In Proceedings of the ACM International Conference on Multimedia, 12 pages, ACM Press, 2001, incorporated by reference herein; or Tieu et al., "Boosting Image Retrieval," International Journal of Computer Vision 56(1/2), pp. 17-36, 2004, Accepted Jul. 16, 2003, incorporated by reference herein). Support Vector Machines maintain a single hyperplane in the embedding space. Variants of Support Vector Machines may use active learning not only to identify new constraints at each iteration, but also to select an informative set of candidate documents at each iteration.

Alternatively a so-called "online learning algorithm" may be implemented (http://en.wikipedia.org/wiki/Online_machine_learning, visited 29 Apr. 2015) or a so-called "multi-armed bandit" learning algorithm (http://en.wikipedia.org/wiki/Multi-armed_bandit, visited 29 Apr. 2015), either of which can be used to accomplish the same result. Both these documents are incorporated by reference herein.

Online learning algorithms, as the term is used herein, maintain a model or hypothesis that is incrementally updated based on training data. That is, these algorithms do not require access to the complete set of training data, or in the present context the complete set of user feedback. When new training data is presented, these algorithms can update their model or hypothesis without having to re-train the system with previously seen training data. Rather these algorithms maintain a model or hypothesis that is updated incrementally based only on the most recent set of feedback. Because of this they can require substantially less memory and/or computational resources, allowing them, for example, to be performed on a mobile device. In the context of the present description the hypothesis may be used to represent the geometric constraints. For example, it may represent a hyperplane in the embedding space, or it may represent a weighted combination of items in a catalog where items with larger weight are understood to be closer to the target item. Users' feedback is interpreted as the training data that the online learning algorithm uses to learn from. That is, the online learning algorithm updates its hypothesis (geometric constraints) based on this feedback.

In one implementation, the online learning algorithm uses the "Prediction with Expert Advice" framework (Cesa-Bianchi et al., Prediction, Learning, and Games, Cambridge University Press, 2006, incorporated by reference herein). In this case each catalog item (document) is interpreted as an expert and assigned a weight. Initially, these weights are all the same. Each catalog item when combined with the associated distance can be understood to provide an ordering of the catalog. Specifically, for a catalog item A, all other items in the catalog, X for example, may be assigned a number corresponding their distance, e.g., d(A, X). The items in the catalog may then be sorted using that number, i.e., d(A, X). For a set of candidates each expert corresponding to a catalog item, e.g., A, recommends the selection of the item, e.g., X, it ranks highest in that set, i.e., the item for which d(A, X) is smallest. The weight of each expert is then increased or decreased depending on whether the user selected that expert's highest ranked item. Proceeding iteratively the item the user is searching for will be correct (i.e., recommend the correct item from the candidate set) more often than any other item and so will obtain the largest weight. Many variations on this general approach are possible. Generally online learning algorithms do not also provide a natural means to yield a discriminative subset. However, they may be combined with a variety of other means to do so including means based on PCA, clustering, or any other means by which a highly discriminative subset can be chosen including brute force search methods.

Multi-armed bandit algorithms are closely related to the "Prediction with Expert Advice" framework. Similarly to online learning algorithms these algorithms maintain a hypothesis that is incrementally updated based on user feedback. Rather than maintain the complete set of user feedback they update their hypothesis based only on the most recent feedback. Again, this means that these algorithms may require fewer computational resources and may therefore be performed on a mobile device. This would allow the constraints to be managed on the mobile device rather than on a separate server. These algorithms likewise maintain a set of experts (referred to as "arms") and seek to identify a good one. The key distinction (in the present setting) is that at each round these algorithms select one or more "arms" (or experts) to play. In the present context "play" means present to the user. Arms are selected so as to balance two goals: play good arms, and learn which arms are good. The user feedback is then interpreted as reward to the selected arms, e.g., if the user clicks on one of the arms that may translate to high reward.

One way such an algorithm may be adapted to maintain and update the geometric constraints, and to select a subset of candidates is described below. Clearly, other adaptations may also be effective. Again each item (document) in the catalog is associated with an arm (expert). Each arm is associated with an estimate of its reward (i.e., its suitability as the solution to the query) and a confidence interval (certainty value) for that estimate. Initially, all of the reward estimates are equal and all of the certainties are identical. At each iteration of the search procedure one or more arms are selected as the "discriminative set" and presented to the user. The user clicks on one of the candidates and the corresponding arm is provided with high reward. The other candidates are provided with low reward. The corresponding reward estimates are updated. The certainty of each of the arms in the candidate set is increased as more data has been collected to estimate its reward. Now the algorithm selects another set of candidates (arms) such that the set contains arms with either high reward or large uncertainty about their reward or both. Proceeding iteratively, the target of the user's search will obtain a highly certain estimate of high reward and be identified as the best arm.

Note that at least operations 410, 412 and 414 can happen in any order. In one implementation, operation 410 occurs continuously in the background, separately from the remainder of the operations, and updates the document catalog in the embedding space asynchronously with the remainder of the operations.

In general, the logic of FIG. 4, as well as other sequences and flowcharts herein, can be implemented using processors programmed using computer programs stored in memory accessible to the computer systems and executable by the processors, by dedicated logic hardware, including field programmable integrated circuits, or by combinations of dedicated logic hardware and computer programs. Each block in the flowchart or phase in a logic sequence describes logic that can be implemented in hardware or in software running on one or more computing processes executing on one or more computer systems. In one implementation, each operation of the flowchart or phase in a logic sequence illustrates or describes the function of a separate module of software. In another implementation, the logic of the operation is performed by software code routines which are distributed throughout more than one module. In addition, as the term is used herein, a "module" can include one or more "sub-modules," which are themselves considered herein to constitute "modules." As with all flowcharts and logic sequences herein, it will be appreciated that many of the operations can be combined, performed in parallel or performed in a different sequence without affecting the functions achieved. In some cases, as a person of ordinary skill in the present field of invention will appreciate, a re-arrangement of operations will achieve the same results only if certain other changes are made as well. In other cases, as the person of ordinary skill in the present field of invention will appreciate, a re-arrangement of operations will achieve the same results only if certain conditions are satisfied. Furthermore, it will be appreciated that the flowcharts and logic sequences herein show only aspects that are pertinent to an understanding of the present disclosure, and it will be understood that in a specific implementation, numerous additional operations for accomplishing other functions for that implementation can be performed before, after and between those operations shown.

In some implementations, the development and maintenance of new or updated constraints is performed on a mobile device, whereas the document catalog in embedding space is maintained on a server which is separated from the mobile device by a network that includes a Wi-Fi or cellular data link or both. The overall arrangement still performs the operations of FIG. 4 (with its variations as described elsewhere herein), but the arrangement embodies a specific and highly advantageous allocation of functions among the two nodes. In particular, the memory and computational resources required to maintain and update the constraints are minimal enough as to allow constraint management to be performed and maintained on a mobile device such as a phone or tablet, rather than on a server.

Mobile Device and Server Implementation of Visual Interactive Search System

FIG. 5 is a block diagram of various components of a server 510 and a mobile device 512 for implementing the visual interactive search system as discussed above with reference to FIGS. 1-4.

Referring to FIG. 5, the server 510 has accessibly thereto a document catalog database 516 previously embedded into an embedding space. The server 510 also includes a candidate space identification module 524, which has access to the document catalog database 516. The candidate space identification module 524 determines the candidate space at each iteration of the search, by applying the initial query and the then-current set of constraints to the documents in the document catalog database 516. The resulting candidate space is stored temporarily into a candidate space database 526. In an implementation, the candidate space database 526 contains pointers to documents in the document catalog database 516, rather than any actual documents. The server 510 also optionally includes a discriminative selection module 528, which selects a discriminative collection of the documents from the candidate space database 526 for transmission to the mobile device 512.

The mobile device 512 includes a user interaction module 522, which presents collections of documents to the user at each iteration, and receives user feedback concerning the collection. The user interaction module 522 forwards the user feedback to a constraints management module 532, which manages content of a constraints database 534. If the user interaction module 522 receives a user commit indication, it notifies an action module 530 which takes some action with respect to the user's selected document such as the actions mentioned elsewhere herein with respect to FIG. 5.

FIG. 6 illustrates content of the constraints database 534 of FIG. 5 according to an implementation of the present disclosure.

Referring to FIG. 6, the constraints database 534 contains a last-in-first-out stack, in which each level corresponds to a respective iteration of the search. Each i'th level stores sufficient information to identify the geometric constraints that resulted from the user's i'th iteration of feedback in response to viewing a collection of documents that were presented to the user. In one implementation, all the constraints in effect for each iteration of the search are described in the stack entry for that iteration. In another implementation, where constraints are cumulative, only the set of constraints that were added in each iteration is described in the stack entry for that iteration, all other constraints applicable to that stack entry being implied due to their presence in stack entries corresponding to prior iterations. In general, each stack entry "identifies" the set of constraints applicable at the corresponding iteration.

Referring to FIG. 6, the stack entry for each i'th iteration contains only two fields: a selected field 610 identifying all of the documents in the i'th iteration that the user selected from a collection of documents with which the user was presented, and a non-selected field 612 identifying all of the documents that were presented to the user for the i'th iteration but which the user did not select. The documents identified in the selected field 610 are sometimes referred to herein as the i'th selected subset of documents, and the documents identified in the non-selected field 612 are sometimes referred to herein as the i'th non-selected subset of the documents that the user selected from a collection of documents. User selection of the i'th selected subset indicates that the user considers the documents selected as being more relevant to a target than the documents in the i'th non-selected subset.

Further, referring to FIG. 6 it is assumed, for clarity of illustration, that only three documents were presented to the user at each iteration, and that the user selected only one of them. For iteration 1 the user was presented with documents A, B and C, and the user selected document A. For iteration 2 the user was presented with documents D, E and F, and the user selected document D. For iteration 3 the user was presented with documents G, H and I, and the user selected document G. For iteration 4 the user was presented with documents J, K and L, and the user selected document J. The system interprets each entry to define a separate geometric constraint for each pair of documents identified in the corresponding level of the stack, where one document of the pair is identified in the selected field 610 and the other document of the pair is identified in the non-selected field 612. Thus level 1 of the stack defines a constraint using the pair (A,B) and another constraint using the pair (A,C). Level 2 of the stack defines a constraint using the pair (D,E) and another constraint using the pair (D,F), and so on. The actual constraint is that a candidate document X, in order to satisfy the constraint, must be closer in the embedding space to the first document of the pair than it is to the second document of the pair. Thus level 1 of the stack defines the constraints that a candidate document X must be closer to A in the embedding space than it is to B, and also closer to A in the embedding space than it is to C. These constraints are abbreviated for purposes of the present disclosure as $d(X,A) < d(X,C)$ and $d(X,A) < d(X,B)$, where 'd' means distance in the embedding space. Similarly, level 2 of the stack defines the constraints that candidate document X must be closer to D in the embedding space than it is to E, and also closer to D in the embedding space than it is to F. These constraints are abbreviated for purposes of the present disclosure as $d(X,D) < d(X,F)$ and $d(X,D) < d(X,E)$, and so on. It can be seen that if the selected field 610 in iteration i identifies Pi documents, and the non-selected field 612 in iteration i identifies Qi documents, then the contents of each iteration i define a total of Pi*Qi constraints, one for each combination of a document in the selected field 610 and a document in the non-selected field 612. It will be appreciated that other ways of representing the constraints added in each iteration can be used in different implementations.

FIG. 7 is a diagram illustrating primary types of messages that pass between the mobile device 512 and the server 510, as illustrated in FIG. 6, according to an implementation of the present disclosure.

Referring to FIG. 7, the mobile device 512 acts as a client to the server 510. The mobile device 512 manages the interactions with the user and updates and maintains the constraints in constraints database 534. The server 510 maintains the catalog but retains no state with regard to the user's search (although it may log it for later off-line processing).

Initially, in operation 710, the mobile device 512 receives an initial query from the user via the user interaction module 522, as illustrated in FIG. 5. In operation 712 the mobile device 512 forwards the initial query to the server 510. In operation 714 the candidate space identification module 524 of the server 510, as illustrated in FIG. 5, applies the initial query to the document catalog database 516, as illustrated in FIG. 5, to determine an initial candidate space.

In operation 716 the discriminative selection module 528 of the server 510, as illustrated in FIG. 5, determines a discriminative collection of the documents from the then-current candidate space, though in another implementation, the collection selected in operation 716 need not necessarily be discriminative. By operation 718, the server 510 transmits a message to return the selected collection to the mobile device 512 and discards the constraints or query that it used in operations 714 and 716. The message transmitted in operation 718 includes all information necessary for presentation to the user and maintenance of the constraints, such as document images, meta-data about the documents, and an indication of their embedding in the embedding space.

In operation 720 the mobile device 512 presents the discriminative collection to the user, for example by displaying an image of each document. In operation 722 the mobile device 512 receives relative feedback from the user, in the form of user selection of one or more of the documents that were presented to the user in operation 720. In operation 724 the constraints management module 532 determines new geometric constraints based on the user's feedback, and in operation 726 the mobile device 512 updates the constraints database 534 with the new constraints. In operation 728, the mobile device 512 then sends a message including the then-current set of constraints from the constraints database 534 (which contains all relevant information about the search state) to the server 510, together with the initial query from operation 710. This process now loops back to operation 714 with the server 510 applying the initial query and the then-current set of geometric constraints to the document catalog database 516 to derive the next candidate space.

As can be seen, the server 510 is stateless with regard to a given user's search. This has several benefits, such as: 1) a load on the server 510 and or additional servers is decreased, 2) it is easier to scale by adding more servers as each iteration of a query interaction could go to a different server, 3) since the server 510 is stateless the system is more robust, so for example if a server 510 fails the state is retained on the mobile device 512. Additionally, since the constraints stored in constraints database 534 fully encode the user's feedback during the current and all prior search iteration, they require minimal storage and management.

As mentioned, the message transmitted in operation 718 includes document images. Though these are typically not large, many caching schemes could be implemented that would retain catalog items on the mobile device 512. These include methods that cache popular items, or items that are predicted to be of interest to the user based on demographic information or search histories. Items could also be pre-fetched onto the mobile device 512 by predicting what items might need to be presented in later iterations of the search.

Specific Implementations of Embedding Documents in an Embedding Space

FIGS. 8, 9, 10, 11, 12, 13A and 13B illustrate specific implementations of embedding documents in an embedding space according to an implementation of the present disclosure. Specifically, FIGS. 8-13B illustrate a set of documents embedded in 2-dimensional space. Aspects of the present disclosure envision embedding documents in spaces of large dimensionality, hence two dimensions is for illustration purposes only.

Figure 8:
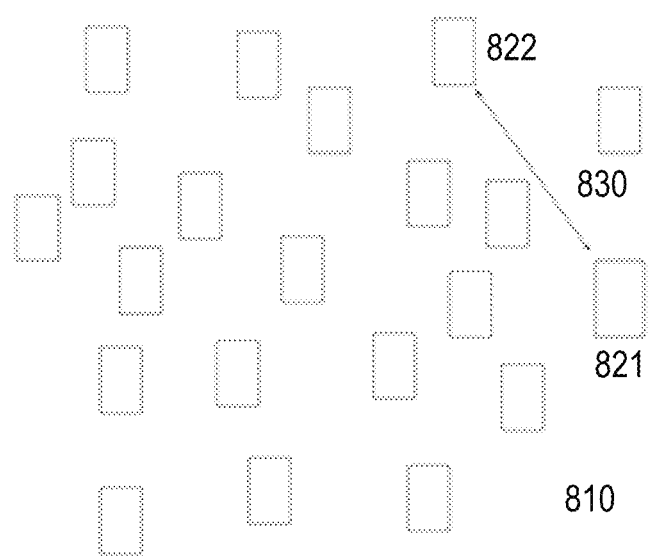
FIGS. 8, 9, 10, 11, 12, 13A and 13B illustrate specific implementations of embedding documents in an embedding space according to an implementation of the present disclosure.

Referring to FIG. 8, a space 810 contains documents, e.g., 821, 822. Each pair of documents has a distance 830 between them.

Figure 9:
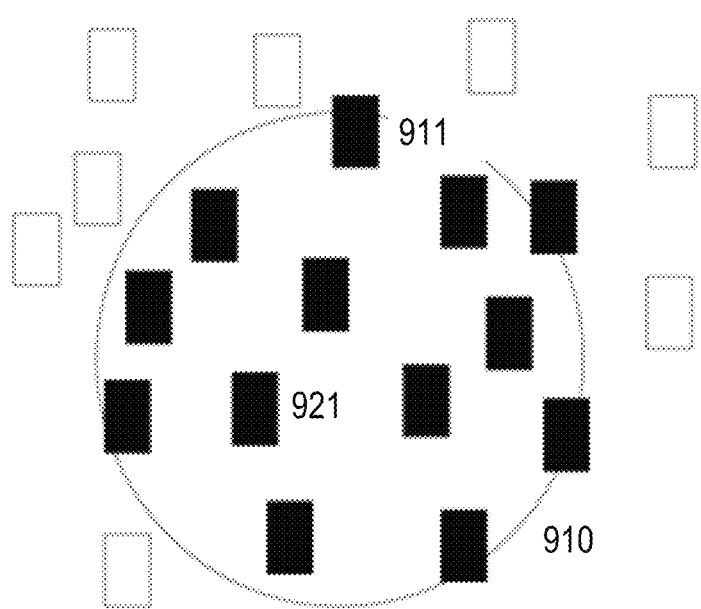

Referring to FIG. 9, the set of documents from FIG. 8 is illustrated in addition to a circular geometric constraint 910. Those documents inside the circle, e.g., 921 and 911 are said to satisfy the constraint. Aspects of the present disclosure express queries and user input in the form of such geometric constraints. The documents that satisfy the constraints are the current results of the query. As the user provides further input additional constraints may be added, or existing constraints may be added or removed.

Figure 10:
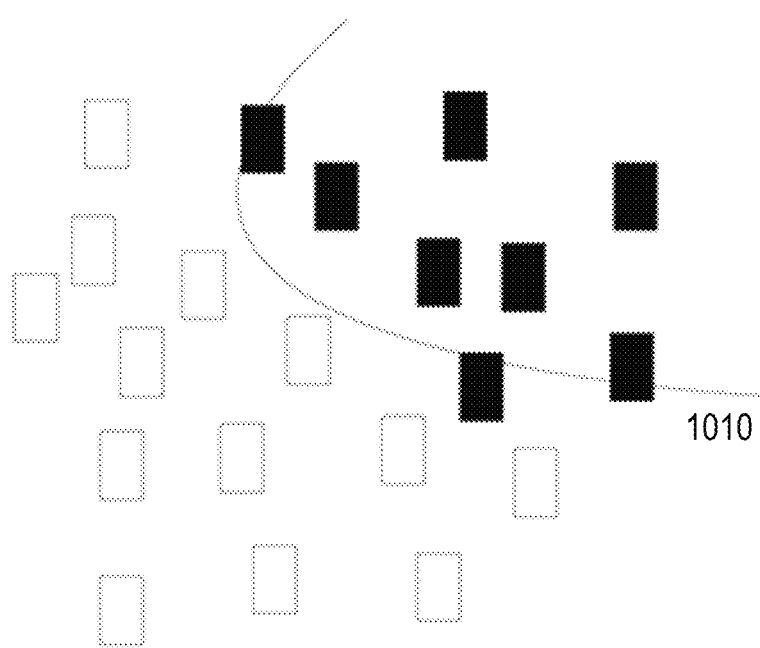

Referring to FIG. 10, the set of documents from FIG. 8 is illustrated in addition to a non-circular geometric constraint 1010. Various implementations may include geometric constraints of an arbitrary shape, and unions, intersections and differences of such constraints.

Figure 11:
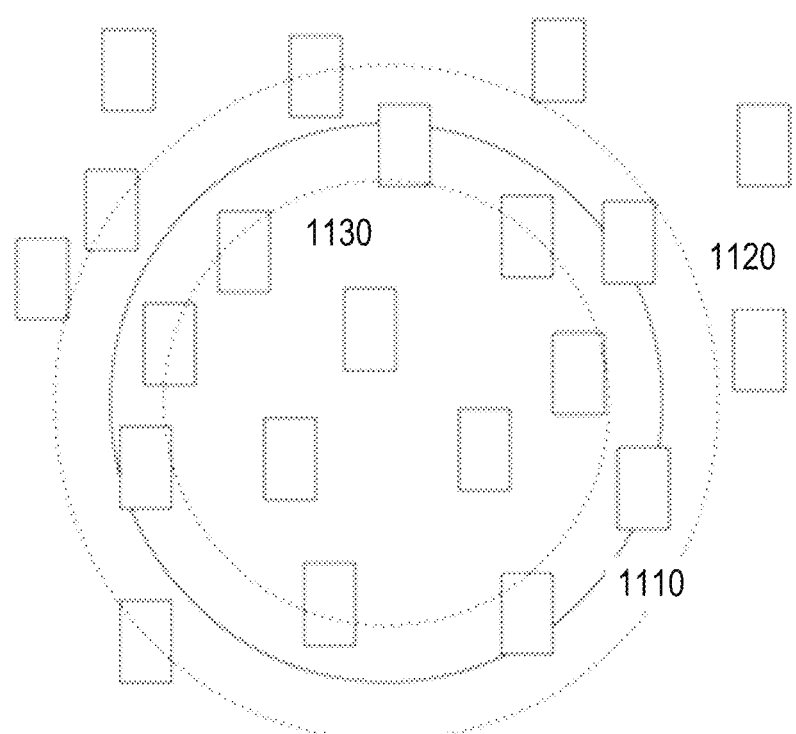

Referring to FIG. 11, a means by which the circular constraint of FIG. 9 may be updated in response to user input is illustrated. An original circular constraint 1110 may be modified by increasing its radius to produce circular constraint 1120, or by decreasing its radius to produce circular constraint 1130. These modifications are done in response to user input. The set of documents satisfying these constraints will change as the constraints are modified thus reducing or expanding the set of images considered for display to the user.

Referring to FIG. 12, a means by which a discriminative subset of documents may be selected for presentation to the user is illustrated. The documents highlighted, e.g., 1211 and 1212, are distinct from each other and from the others contained in the circular constraint region.

Referring to FIG. 13A, a set of documents in embedding space is illustrated, in which the query processing module 140, as illustrated in FIG. 1, has narrowed the collection to those documents within the circle 1320, and has identified a primary result document 1318. In addition, the discriminative selection module 160, as illustrated in FIG. 1, has selected documents 1310, 1312, 1314 and 1316 as the discriminative set to present to the user. In the embedding space, documents 1312, 1318 and 1316 are substantially collinear, and documents 1310, 1318 and 1314 are substantially collinear.

Referring to FIG. 13B, an illustration is provided to describe how the system may present the set of documents in layout space (the broken lines are implied, rather than visible). The specific positions of the documents do not necessarily match those in embedding space, in part because dimensionality of the space has been reduced. However, documents which were substantially collinear in embedding space are collinear in layout space. In particular, if the broken lines in FIG. 13A represent dimensions in embedding space along which the candidate documents differ, the placement of the documents in layout space in FIG. 13B are indicative of those same dimensions. In addition, the relative distances among the documents along each of the lines of collinearity in layout space also are indicative of the relative distances in embedding space.

Implementations of Visual Interactive Search for Physical and/or Digital Products FIG. 14 illustrates a visual interface that enables searching for shoes using a visual interactive search environment on a mobile device according to an implementation of the present disclosure. In this implementation the catalog (e.g., the document catalog database 120, as illustrated in FIG. 1) is maintained and candidate results are identified on a server (e.g., the server computer 212, as illustrated in FIG. 2), while the constraints are maintained on a mobile device 1401. Implementations of this architecture are also discussed above with reference to FIGS. 5-7.

The shoes are embedded in a high dimensional space by applying a neural network trained to capture the visual similarity between shoes. Other contributions are made to the embedding using Kernels that compare meta-data about the shoe, e.g., its brand. The primary result 1402 is displayed prominently as a large image in the top left corner. The shoe 1403 that is closest to the primary result in the embedded space (i.e., is most similar) is displayed closest to the primary result. A discriminative set of results that satisfies the current constraints is then displayed. These constraints may be hard or soft constraints in different implementations, or some may be hard constraints and others soft constraints. Note that these results retain significant diversity, e.g., the shoe 1404 that is farthest in the embedding space (and displayed farthest from the primary result) is a different color, but the same brand as the primary result. This implementation maintains a stack of constraints. Each constraint requires the candidate to be closer to a user-selected image than one non-selected image. Thus at each iteration multiple constraints, e.g., 11, may be added. In one implementation, these constraints are treated as soft constraints in that each candidate suffers a penalty for each broken constraint. The candidate results are those with smaller penalties. In this implementation the stack of selected images is displayed at 1405 with the oldest user selection at the left and newer ones to the right. The user may click on any image in this stack. This will removed all images (and their associated constraints) to the right of the clicked image off the stack. This has the effect of taking the user back to a previous search state, defined by the set of constraints that were in effect before the clicked image was selected.

The search method of FIG. 4 (including all its variations as mentioned herein) may be used for various purposes, several of which are outlined below with reference to FIGS. 15-18. Many of the operations discussed with reference to FIGS. 15-18 are similar to those discussed above with reference to FIG. 4 and detailed descriptions thereof may be omitted.

Figure 15:
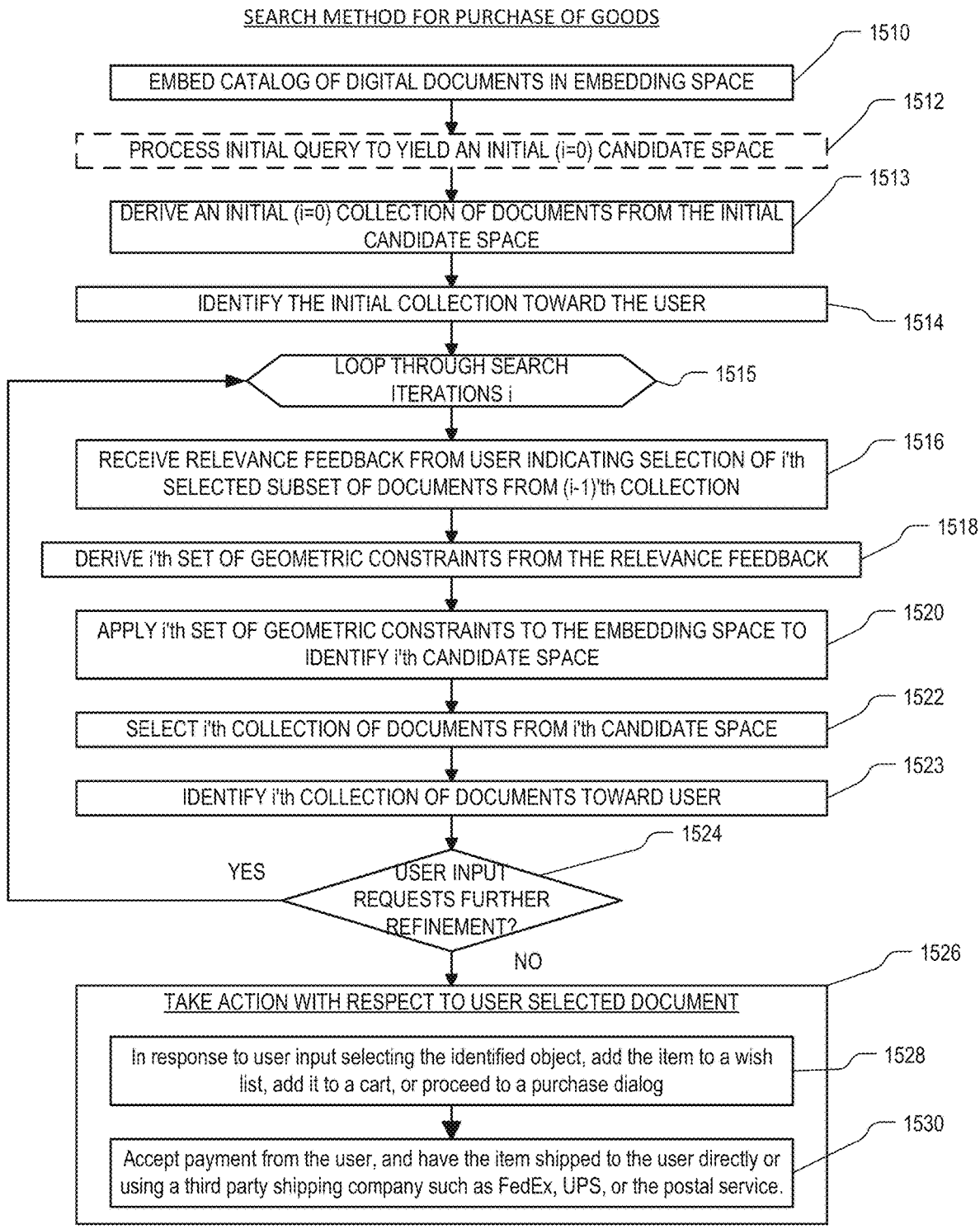
FIG. 15 is a flowchart expanding the various logic phases illustrated in FIG. 4 to implement a purchase of a physical product such as clothing, jewelry, furniture, shoes, accessories, real estate, cars, artwork, photographs, posters, prints, and home décor according to an implementation of the present disclosure.

FIG. 15 is a flowchart expanding the various logic phases illustrated in FIG. 4 to implement a purchase of a physical product such as clothing, jewelry, furniture, shoes, accessories, real estate, cars, artworks, photographs, posters, prints, and home décor, according to an implementation of the present disclosure. All of the variations mentioned herein can be used with the process illustrated in FIG. 15.

Referring to FIG. 15, in operation 1510, a catalog of digital documents is embedded in an embedding space and stored in a database. In the database, a distance is identified between each pair of the documents in the embedding space corresponding to a predetermined measure of dissimilarity between the products represented by the pair of documents.

In operation 1512, an initial query is optionally processed to yield an initial (i=0) candidate space of documents satisfying the query results. The initial query may be a conventional text query, for example. The initial candidate space is within and optionally smaller than the full catalog of documents.

In operation 1513 an initial collection of digital documents is derived from the initial candidate space. This initial (i=0) collection of documents is a subset of the initial candidate space. In one implementation the initial collection of documents is selected as a discriminative subset of the catalog, while in another implementation the initial collection of documents is not discriminative.

In operation 1514, the initial collection of documents is identified toward the user. In one implementation this can include displaying a representation of the documents in the initial collection visibly to the user.

In operation 1515 an iterative search process is initiated beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from operation 1514. If i>1, then this collection of documents is the (i−1)'th collection of documents as presented to the user in operation 1523 of the prior iteration.

At the beginning of the i'th iteration, in operation 1516, the user provides relative feedback as to the documents in the (i−1)'th collection of documents. Preferably the relative feedback takes the form of user selection of a subset of the documents from the (i−1)'th collection, where selection of a document implies that the user considers products represented by that document to be more relevant to a search target than the products represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset.

In operation 1518, a set of geometric constraints is derived from the relative feedback, in a manner described elsewhere herein. The set of geometric constraints derived in the i'th iteration is referred to as the i'th set of geometric constraints.

In operation 1520, the i'th set of geometric constraints is applied to the embedding space to form an i'th candidate space, and in operation 1522 an i'th collection of candidate documents is selected as a subset of the documents in the i'th candidate space. In one implementation the i'th collection of documents is selected as a discriminative subset of the i'th candidate space, while in another implementation the i'th collection of documents is not discriminative.

In operation 1523 the i'th collection of documents is presented toward the user for optional further refinement. In operation 1524, if user input indicates further refinement is desired, then the logic returns to operation 1515 for the next iteration of the search loop. Otherwise the user indicates to commit, and in operation 1526 the system takes action with respect to the user-selected document.

The "take action" operation 1526 of FIG. 15, then involves: (1) in response to user input selecting the identified object, the system to adding the item to a wish list, adding it to a cart, or proceeding to a purchase dialog (operation 1528); and (2) the system, perhaps at a later time, accepting payment from the user, and having the item shipped to the user directly or using a third party shipping company such as FedEx, UPS, or the postal service (operation 1530). The operations of accepting payment and shipping can be performed in any order. For free products payment may not be required. Corresponding submodules for performing these operations may be included in the action module 170, as illustrated in FIG. 1.

Figure 16:
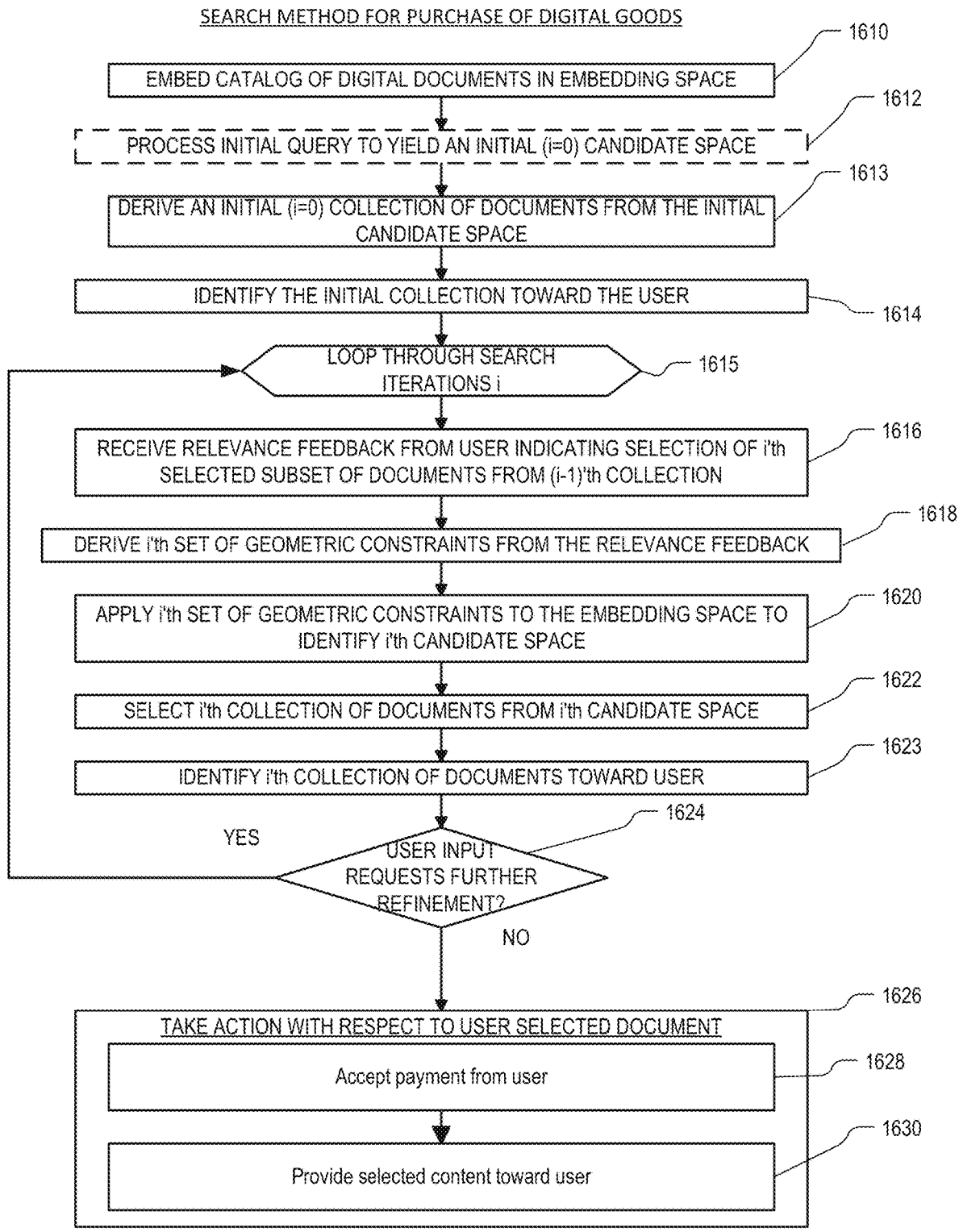
FIG. 16 is a flowchart expanding the various logic phases illustrated in FIG. 4 to implement a purchase of a digital product such as movies, music, photographs and books according to an implementation of the present disclosure.

FIG. 16 is a flowchart expanding the various logic phases illustrated in FIG. 4 to implement a purchase of a digital product such as movies, music, photographs, or books according to an implementation of the present disclosure. All of the variations mentioned herein can be used with the operations illustrated in FIG. 16.

Referring to FIG. 16, in operation 1610, a catalog of digital documents is embedded in an embedding space and stored in a database. In the database, a distance is identified between each pair of the documents in the embedding space corresponding to a predetermined measure of dissimilarity between digital products represented by the pair of documents.

In operation 1612, an initial query is optionally processed to yield an initial (i=0) candidate space of documents satisfying the query results. The initial query may be a conventional text query, for example. The initial candidate space is within and optionally smaller than the full catalog of documents.

In operation 1613 an initial collection of digital documents is derived from the initial candidate space. This initial (i=0) collection of documents is a subset of the initial candidate space. In one implementation the initial collection of documents is selected as a discriminative subset of the catalog, while in another implementation the initial collection of documents is not discriminative.

In operation 1614, the initial collection of documents is identified toward the user. In one operation this can include displaying a representation of the documents in the initial collection visibly to the user.

In operation 1615 an iterative search process is initiated beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from operation 1614. If i>1, then this collection of documents is the (i−1)'th collection of documents as presented to the user in operation 1623 of the prior iteration.

At the beginning of the i'th iteration, in operation 1616, the user provides relative feedback as to the documents in the (i−1)'th collection of documents. Preferably the relative feedback takes the form of user selection of a subset of the documents from the (i−1)'th collection, where selection of a document implies that the user considers the digital product represented by that document to be more relevant to a search target than digital products represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset.

In operation 1618, a set of geometric constraints is derived from the relative feedback, in a manner described elsewhere herein. The set of geometric constraints derived in the i'th iteration is referred to as the i'th set of geometric constraints.

In operation 1620, the i'th set of geometric constraints is applied to the embedding space to form an i'th candidate space, and in operation 1622 an i'th collection of candidate documents is selected as a subset of the documents in the i'th candidate space. In one implementation the i'th collection of documents is selected as a discriminative subset of the i'th candidate space, while in another implementation the i'th collection of documents is not discriminative.

In operation 1623 the i'th collection of documents is presented toward the user for optional further refinement.

In operation 1624, if user input indicates further refinement is desired, then the logic returns to operation 1615 for the next iteration of the search loop. Otherwise the user indicates to commit, and in operation 1626 the system takes action with respect to the user-selected document.

The "take action" operation 1626 in FIG. 16, then involves the system, optionally and perhaps at a later time, accepting payment from the user (operation 1628) and providing the content to the user (or having it provided) using some means of distributing digital content, e.g., email or streaming (operation 1630). The operations of accepting payment and providing content can be performed in any order. For free products payment may not be required. Corresponding submodules for performing these operations can be included in the action module 170, as illustrated in FIG. 1.

Figure 17:
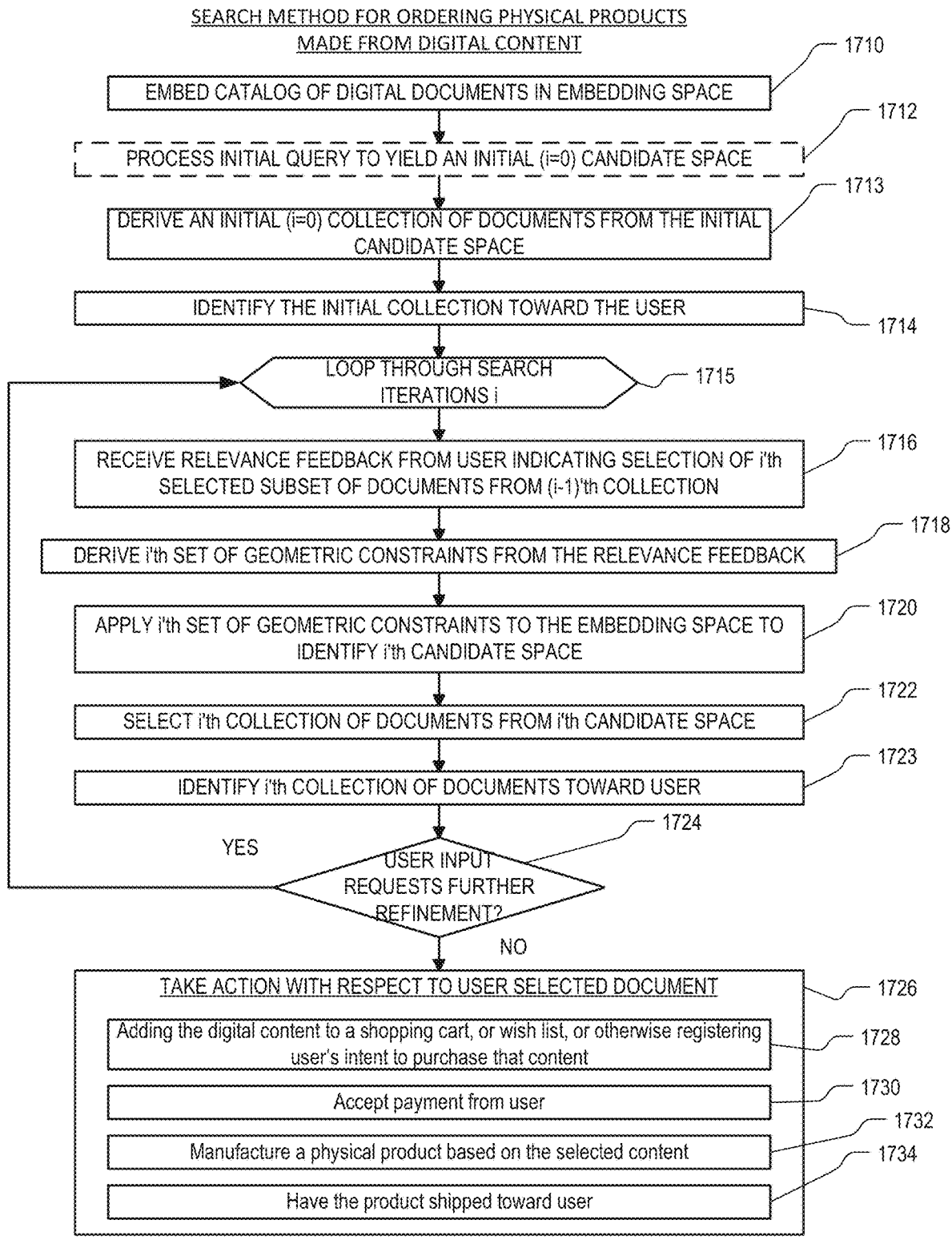
FIG. 17 is a flowchart expanding the various logic phases illustrated in FIG. 4 to implement an identification of digital product that can be used to produce a physical product according to an implementation of the present disclosure.

FIG. 17 is a flowchart expanding the various logic phases illustrated in FIG. 4 to implement an identification of digital content that can be used to produce a physical product according to an implementation of the present disclosure. For example, the digital content may consist of a catalog of images which may then be printed on a poster, t-shirt, or mug. All of the variations mentioned herein can be used with the operations illustrated in FIG. 17.

Referring to FIG. 17, at operation 1710, a catalog of digital documents is embedded in an embedding space and stored in a database. In the database, a distance is identified between each pair of the documents in the embedding space corresponding to a predetermined measure of dissimilarity between digital content represented by the pair of documents.

In operation 1712, an initial query is optionally processed to yield an initial (i=0) candidate space of documents satisfying the query results. The initial query may be a conventional text query, for example. The initial candidate space is within and optionally smaller than the full catalog of documents.

In operation 1713 an initial collection of digital documents is derived from the initial candidate space. This initial (i=0) collection of documents is a subset of the initial candidate space. In one implementation the initial collection of documents is selected as a discriminative subset of the catalog, while in another implementation the initial collection of documents is not discriminative.

In operation 1714, the initial collection of documents is identified toward the user. In one implementation this can include displaying a representation of the documents in the initial collection visibly to the user.

In operation 1715 an iterative search process is initiated beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from step 1714. If i>1, then this collection of documents is the (i−1)'th collection of documents as presented to the user in operation 1723 of the prior iteration.

At the beginning of the i'th iteration, in operation 1716, the user provides relative feedback as to the documents in the (i−1)'th collection of documents. Preferably the relative feedback takes the form of user selection of a subset of the documents from the (i−1)'th collection, where selection of a document implies that the user considers the digital content represented by that document to be more relevant to a search target than digital content represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset.

In operation 1718, a set of geometric constraints is derived from the relative feedback, in a manner described elsewhere herein. The set of geometric constraints derived in the i'th iteration is referred to as the i'th set of geometric constraints.

In operation 1720, the i'th set of geometric constraints is applied to the embedding space to form an i'th candidate space, and in operation 1722 an i'th collection of candidate documents is selected as a subset of the documents in the i'th candidate space. In one implementation the i'th collection of documents is selected as a discriminative subset of the i'th candidate space, while in another implementation the i'th collection of documents is not discriminative.

In operation 1723 the i'th collection of documents is presented toward the user for optional further refinement.

In operation 1724, if user input indicates further refinement is desired, then the process returns to operation 1715 for the next iteration of the search loop. Otherwise the user indicates to commit, and in step 1726 the system takes action with respect to the user-selected document.

The "take action" operation 1726 in FIG. 17, then involves the following steps performed by the system. First the selected digital content is added to a shopping cart, or wish list, or otherwise recording the user's intent to purchase a product based on the selected content (operation 1728). This operation may also include recording the user's selection of a particular kind of product (e.g. a mug or a mouse pad).

In operation 1730, payment is accepted from the user. In operation 1732 a physical product is manufactured based on the selected content, e.g., by reproducing the selected content on a physical artifact. In operation 1734 the physical product is shipped to the user or the physical product is shipped by a delivery service.

The operation 1730 of accepting payment may be performed after the manufacturing operation 1732 or after the shipping operation 1734 in various implementations. Also, corresponding submodules for performing these operations can be included in the action module 170, as illustrated in FIG. 1. Preferably, the sole purpose of the above implementation is to identify content to enable the manufacture and purchase of a physical product.

Figure 18:
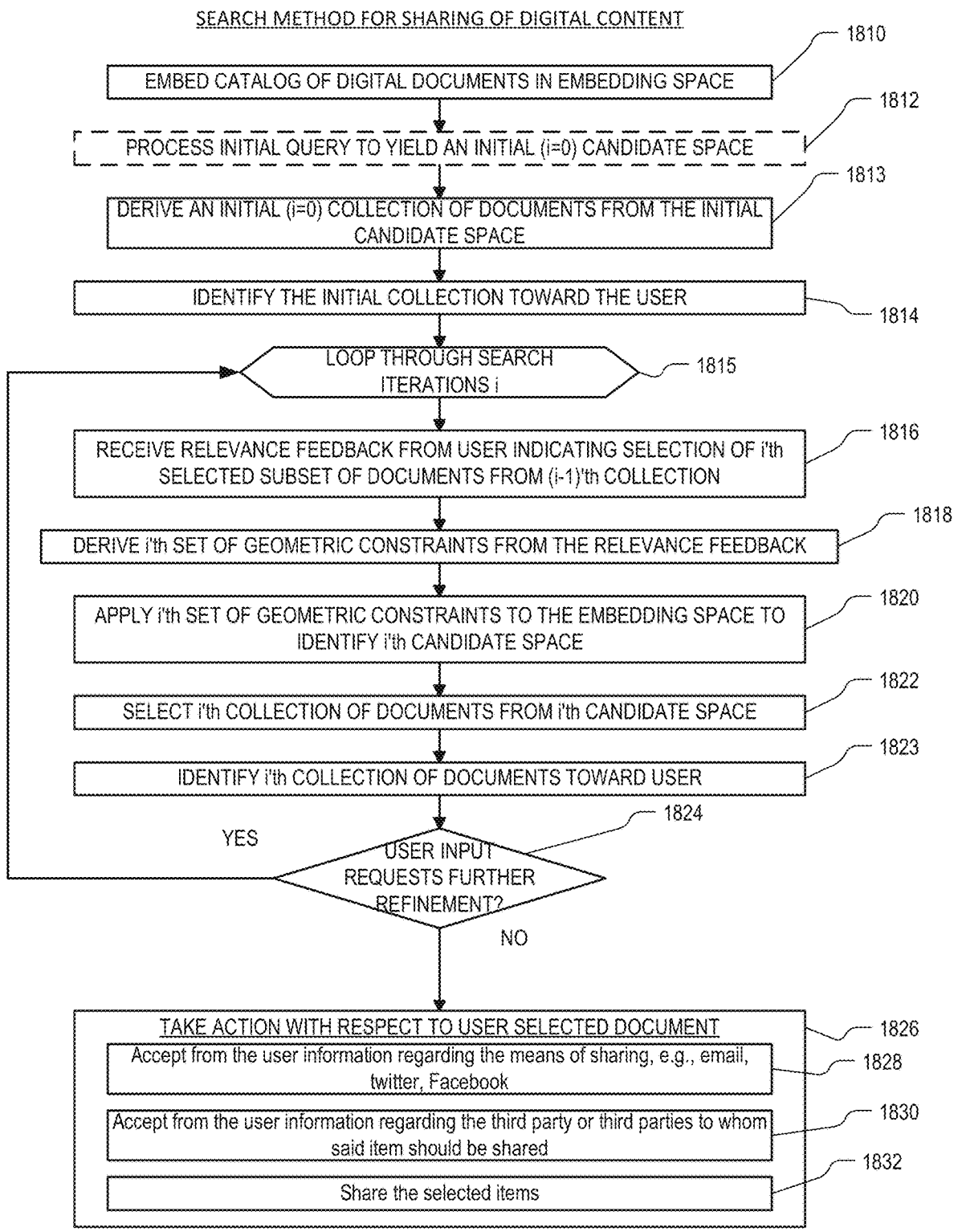
FIG. 18 is a flowchart expanding the various logic phases illustrated in FIG. 4 to implement an identification of content for sharing according to an implementation of the present disclosure.

FIG. 18 is a flowchart expanding the various logic phases illustrated in FIG. 4 to implement an identification of content for sharing according to an implementation of the present disclosure. For example, the digital documents in the embedding space may consist of a catalog of the user's personal photographs or other media. All of the variations mentioned herein can be used with the process illustrated in FIG. 18.

Referring to FIG. 18, in operation 1810, a catalog of digital documents is embedded in an embedding space and stored in a database. In the implementation illustrated in FIG. 15, the catalog may be the user's library of personal photographs, for example. In the database, a distance is identified between each pair of the documents in the embedding space corresponding to a predetermined measure of dissimilarity between content represented by the pair of documents.

In operation 1812, an initial query is optionally processed to yield an initial (i=0) candidate space of documents satisfying the query results. The initial query may be a conventional text query, for example. The initial candidate space is within and optionally smaller than the full catalog of documents.

In operation 1813 an initial collection of digital documents is derived from the initial candidate space. This initial (i=0) collection of documents is a subset of the initial candidate space. In one implementation the initial collection of documents is selected as a discriminative subset of the catalog, while in another implementation the initial collection of documents is not discriminative.

In operation 1814, the initial collection of documents is identified toward the user. In one implementation this can include displaying a representation of the documents in the initial collection visibly to the user.

In operation 1815 an iterative search process is initiated beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from operation 1814. If i>1, then this collection of documents is the (i−1)'th collection of documents as presented to the user in operation 1823 of the prior iteration.

At the beginning of the i'th iteration, in operation 1816, the user provides relative feedback as to the documents in the (i−1)'th collection of documents. Preferably the relative feedback takes the form of user selection of a subset of the documents from the (i−1)'th collection, where selection of a document implies that the user considers content represented by that document to be more relevant to a search target than content represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset.

In operation 1818, a set of geometric constraints is derived from the relative feedback, in a manner described elsewhere herein. The set of geometric constraints derived in the i'th iteration is referred to as the i'th set of geometric constraints.

In operation 1820, the i'th set of geometric constraints is applied to the embedding space to form an i'th candidate space, and in operation 1822 an i'th collection of candidate documents is selected as a subset of the documents in the i'th candidate space. In one implementation the i'th collection of documents is selected as a discriminative subset of the i'th candidate space, while in another implementation the i'th collection of documents is not discriminative.

In operation 1823 the i'th collection of documents is presented toward the user for optional further refinement.

In operation 1824, if user input indicates further refinement is desired, then the process returns to operation 1815 for the next iteration of the search loop. Otherwise the user indicates to commit, and in operation 1826 the system takes action with respect to the user-selected document.

The "take action" operation 1826 illustrated in FIG. 18, then involves the following operations. In operation 1828 information regarding a means of sharing, e.g., email, twitter, Facebook, etc., is accepted from the user. In operation 1830 information regarding a third party or their parties to whom the item should be shared is accepted from the user. In operation 1832 the selected item(s) are shared.

The operation 1828 of accepting from the user information regarding the means of sharing may be performed before or after the operation 1830 of accepting from the user information regarding the third party or third parties to whom said item should be shared. Also, corresponding submodules for performing three operations can be included in the action module 170, as illustrated in FIG. 1. Preferably the sole purpose of the above implementation is identifying content to be shared.

Learning Distances

User behavior data may be collected by a system according to the present disclosure and the collected user behavior may be used to improve or specialize the search experience. In particular, many ways of expressing distances or similarities may be parameterized and those parameters may be fit. For example, a similarity defined using a linear combination of Kernels may have the coefficients of that linear combination tuned based on user behavior data. In this way the system may adapt to individual (or community, or contextual) notions of similarity.

Similarly, such Kernels or distances may be learned independently of the search method. That is, the Kernels or distances may be learned on data collected in different ways. This data may, or may not, be combined with data captured during the search process.

Of particular interest is the use of deep learning, e.g., neural networks with more than 3 layers, to learn distances or similarity.

In some implementations, distances are learned specifically for specific applications. For example, an implementation uses the method (process) to search for potential partners (e.g., on a dating site) and may learn a Kernel that captures facial similarity. The process may also learn a Kernel that captures a similarity of interests based on people's Facebook profiles. These Kernels (or distances) are learned specifically to address the associated search problem and may have no utility outside of that problem.

Figure 19:
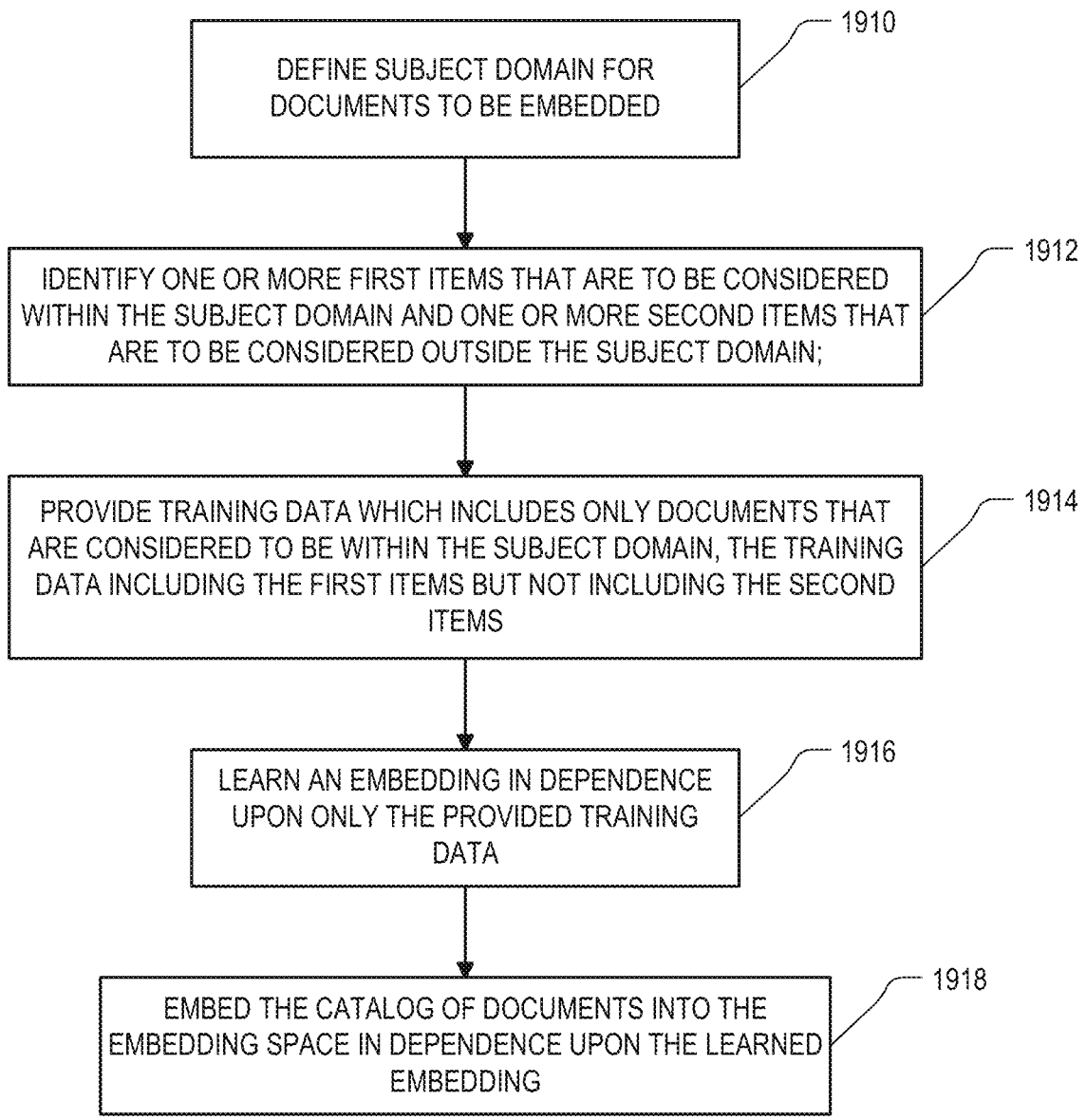
FIG. 19 is a flowchart illustrating various logic phases for learning distances for a subject domain, such as a catalog of documents of an embedding space according to an implementation of the present disclosure.

FIG. 19 is a flowchart illustrating various logic phases for learning distances for a subject domain, such as a subject catalog of products or type of content, according to an implementation of the present disclosure. For example, it may be appropriate to learn or develop an embedding specific to men's shoes. Such an embedding would capture the similarity between men's shoes be would be uninformative with regard to men's shirts.

Referring to FIG. 19, in operation 1910 the subject domain is defined. Examples of subject domains include clothing, jewelry, furniture, shoes, accessories, vacation rentals, real estate, cars, artworks, photographs, posters, prints, home décor, physical products in general, digital products, services, travel packages, or any of a myriad of other item categories.

In operation 1912 one or more items that are to be considered within the subject domain are identified, and one or more items that are to be considered outside the subject domain are identified.

In operation 1914, a training database is provided which includes only documents that are considered to be within the subject domain. This training database includes the first items but not the second items.

In operation 1916 an embedding is learned in dependence upon only the provided training data, i.e. not based on any documents that are considered to be outside the subject domain. A machine learning algorithm can be used to learn this embedding.

In operation 1918, the catalog of documents is embedded into the embedding space using the learned embedding. Preferably the catalog of documents embedded into the embedding space is itself limited to documents within the subject domain. Subsequently processing can later continue with operations 412 or 414 of FIG. 4 or its variants as described herein.

Adjusting Thresholds and Other Variations

Described herein are implementations of the technology disclosed that adjust thresholds (of non-geometric or geometric constraints) throughout the process of the visual interactive search, and perform the embeddings at different points of the overall visual interactive search.

As previously described, documents are encoded in an embedding space such as a vector space or metric space (via a distance). Searches proceed as a sequence of query refinements. Query refinements are encoded as geometric constraints over the vector space or metric space. Discriminative candidate results are displayed to provide the user with the ability to add discriminative constraints. User inputs, e.g., selecting or deselecting results, are encoded as geometric constraints.

One variation of the overall visual interactive search may include embedding the documents after the initial query is performed and only those documents satisfying the query may be embedded. Similarly, the documents may be re-embedded using a different embedding at any point in the process. In this case, the geometric constraints would be re-interpreted in the new embedding.

Another variation of the overall visual interactive search may include augmenting the geometric constraints at any point with non-geometric constraints. In this case the candidate results can be filtered in a straightforward way to select only those satisfying the non-geometric constraints. In this way the interaction can be augmented with faceted search, text, or speech inputs. At each iteration of the process the geometric constraints can be managed together with a set of non-geometric constraints.

An example implementation may proceed through these steps:
1. Obtaining and identification of one or more prototype documents (e.g., images) from a user (the identification can identify one or more prototype documents or may include a text string identifying the one or more prototype documents);
2. Identifying, as candidate documents, all documents in a catalog of documents with a distance less than a threshold T1 from the one or more prototype documents (the distance can correspond to a predetermined measure of dissimilarity with respect to the one or more prototype documents, where the predetermined measure of dissimilarity can be defined using any of the techniques defined in the present disclosure or any other technique that would be apparent to a person of ordinary skill in the present technology);
3. Optionally identifying a discriminative subset of the documents collected in (2);
4. Presenting the discriminative subset of documents to the user in a 2-dimensional layout or presenting a collection of fewer than all of the candidate documents;
5. If the user is satisfied with one or more of the presented documents, receiving an indication of such satisfaction and taking desired action with respect to the one or more selected documents;
6. If the user is not yet satisfied, obtaining from the user a selection of one or more of the presented documents that are more like the desired result;
7. Optionally producing a revised collection of prototype documents;
8. Changing (e.g., increasing or decreasing) the threshold T1 and adjusting the candidate documents to exclude or include additional documents based on the adjusted threshold T1;
9. Goto 2.

It is assumed in the above implementation that a database identifying a catalog of documents in the embedded space is provided or that a catalog of documents in the embedded space is provided. The above implementation may be viewed either from the viewpoint of the user interacting with a computer system, or the viewpoint of a computer system interacting with a user, or both.

The documents may include images, audio, video, text, html, multimedia documents and product listings in a digital catalog.

The concept may also be generalized so that the identification of the one or more prototype documents obtained at step 1 is obtained as the result of the user performing a search (query) within another information retrieval system or search engine.

The concept may also be generalized so that step 8 is replaced with an option to provide a user interface that allows the user to decide whether to increase the threshold T1, decrease the threshold T1 or to leave the threshold T1 unchanged.

The concept may also be generalized so that at steps 1, and 6 there are two collections of documents including one or more prototype images. The first collection of documents including the one or more prototype images obtained at step 1 and the second collection of documents including another collection of one or more prototype documents. At step 2 the system identifies images having both (i) a distance that is less than a threshold T1 of the first collection of documents and (ii) a distance that is greater than a threshold T2 of the second collection of documents. This concept may be further extrapolated in step 8, where the thresholds T1 and T2 are adjusted and the candidate documents are updated accordingly.

The concept may also be generalized so that at one iteration of step 6 the user selects one or more of the presented documents along a first subset of at least one axis, and at another iteration of step 6 the user selects one or more of the presented documents along a second subset of at least one axis, where the second subset of axes contains at least one axis not included in the first subset of axes.

Advantages of the Technology Disclosed Over Prior Systems

Various implementations described herein may yield one or more of the following advantages over prior systems.

One advantage is that an implementation of the technology disclosed need not be limited to a single fixed hierarchy of documents. More specifically, an implementation does not require an explicit determination of a taxonomy by which the document catalog is described. Nor does it require a clustering of documents into a static hierarchy. That is, the sequence of refinements that a user may perform need not be constrained to narrowing or broadening in some pre-defined taxonomy or hierarchy.

Another advantage is that implementations of the technology disclosed can be extremely flexible and may be applied to images, text, audio, video, and many other kinds of data.

Another advantage is that implementations are based on intuitions about the relationships among documents, which are often easier to express using notions of similarity or distance between documents rather than by using a taxonomy or tags.

A further advantage is that selecting and deselecting candidate results in a visual way is a more facile interface for performing search on a mobile device or a tablet.

Another advantage is that encoding query refinements in terms of geometric constraints allows for a more flexible user interaction. Specifically, in an implementation, the user is not required to be familiar with a pre-defined tagging ontology, or with a query logic used to combine constraints. Furthermore, in an implementation such geometric constraints can be more robust to errors in a feature tagging or annotation process.

An additional advantage is that the ability to incrementally refine a search is helpful to a productive user experience.

Another advantage is that the use of a discriminative subset of candidate results makes more effective use of limited display space. The clutter on the display is minimized while simultaneously capturing a high proportion of the information available in the complete results set and providing a wide variety of options for the user to refine a query.

Furthermore, given that distances, embeddings, and similarities may be machine learned, another advantage is that a system using this approach can provide the ability to specialize the search experience to individuals, groups, cultures, and document categories.

Compared to content based image retrieval (CBIR) techniques, an advantage is that an implementation of the present disclosure can be more amenable to incremental refinement of a search. Specifically, a user may take a photograph and use a CBIR system to identify related or highly similar photographs. However, if the user is dissatisfied with the results the CBIR system does not provide them with a way to refine search goals.

An Example Implementation

One implementation allows users to search a catalog of personal photographs. Users are initially shown an arbitrary photograph (the primary result), e.g., the most recent photograph taken or viewed. This is displayed in the center of a 3×3 grid of photographs from the catalog. Each of the photographs is selected to be close (defined below) to the primary result but different from each other along different axes relative to the primary result. For example, if the primary result is a photograph taken with family last week at home, then other photographs may be a) with the family last year at home, b) with the family last week outdoors, c) without the family last week at home, etc. In some situations, the system may place two photographs on opposite sides of the primary result which are along the same axis but differ from each other in their positions along that axis. For example, the photo placed on the left side may show family member A more prominently than in the primary result, while the photo placed on the right side may show family member A less prominently than in the primary result.

The user selects one of the 9 photographs which then becomes the primary result. This is then laid out in an updated 3×3 grid of photographs again "close" to it but different from each other.

If at any point the user double clicks on the primary result then the definition of "close" changes to a "smaller scale" (defined below). If the user uses a "pinch out" gesture then the definition of "close" changes to a "larger scale" and the result set is updated. In this way a user may navigate a catalog of photographs to find specific ones.

In this example photographs may be considered similar with respect to a number of criteria, including: GPS location of the photograph; time of the photograph; color content of the photograph; whether the photograph was taken indoors or outdoors; whether there are people in the photograph; who is in the photograph; whether people in the photograph are happy or sad; the activity depicted in the photograph; and the objects contained in the photograph.

These criteria are captured into a numerical "distance," or as a vector locating photographs in some space. In the latter case a standard notion of similarity or distance may be used, e.g., the dot product or Euclidean distance. In an implementation, a normalization function can be applied in order that distances along different axes are comparable to each other.

As the user navigates a catalog of photos the "scale" at which the user is searching changes. This scale specifies how "close" the photos in the result set are to the primary result. More precisely all photos in the result set must have a "distance" less than some threshold. As the scale increases or decreases this threshold increases or decreases.

Considering this example with respect to the steps described above:

Embedding: For each photograph in a user's catalog of personal photographs a vector is produced that has indices corresponding to, e.g., the longitude, the latitude, the time of day, the day of week, the number of faces, whether a given activity is depicted, among many others.

Initial Query: In this case the initial query is empty, that is all photos are candidate results and the one presented to the user is arbitrary.

Initial Query as geometric constraints: The initial query produces an empty set of geometric constraints The geometric constraints are applied to the set of embedded photographs to identify those that satisfy the constraints, i.e., the candidate results A discriminative subset of 9 photographs is selected from the candidate results using farthest first traversal.

The 9 photographs are presented to the user in a 3×3 grid

The user selects one of the photographs to indicate a desire to see more photographs like that one.

The user selected photograph is processed to yield a new geometric constraint which can be represented as a sphere around the selected photograph in the embedding space. This new constraint is added to the current set of constraints. The combined constraint is the intersection of spheres around all photographs selected so far.

Another Example Implementation

Another implementation looks at searching for accessories (apparel, furniture, apartments, jewelry, etc.). In this implementation the user searches using text, speech, or with a prototype image as an initial query. For example, a user searches for "brown purse" using text entry. The search engine responds by identifying a diverse set of possible results, e.g., purses of various kinds and various shades of brown. These results are laid out in a 2 dimensional arrangement (for example a grid), whereby more similar results are positioned closer to each other and more different results are positioned relatively far from each other. The user then selects one or more images, for example using radio buttons. The image selections are then used by the search engine to define a "search direction" or a vector in the embedding space along which further results may be obtained.

Considering this example with respect to the steps described above:

Embedding: For each entry in an accessories catalog a vector is produced using deep learning techniques trained to differentiate accessories.

Initial Query: In this case the initial query is a textual search that narrows further results to be within a portion of the full catalog. This restricted is the set of initial candidate results.

Initial Query as geometric constraints: The initial query produces an empty set of geometric constraints The geometric constraints are applied to the set of embedded accessories in the restricted set (i.e., the initial candidate results) to identify those that satisfy the constraints, i.e., the candidate results A diverse subset of 9 catalog entries is selected from the candidate results using farthest first traversal.

The 9 catalog entries are presented to the user in a 3×3 grid

The user selects one of the catalog entries to indicate a desire to see more accessories like that one.

The user selected accessory is processed to yield a new geometric constraint which can be represented as a sphere around the selected accessory in the embedding space. This new constraint is added to the current set of constraints. The combined constraint is the intersection of spheres around all accessories selected so far.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

It will be appreciated that the logic described herein for implementing aspects of the invention herein can be implemented using processors programmed using computer programs stored in memory accessible to the computer systems and executable by the processors, by dedicated logic hardware, including field programmable integrated circuits, or by combinations of dedicated logic hardware and computer programs. Each step in a process described herein can be implemented in hardware or in software running on one or more computing processes executing on one or more computer systems. In one embodiment, each step illustrates the function of a separate module of software. In another embodiment, the logic of the step is performed by software code routines which are distributed throughout more than one module. In each embodiment, the code portions forming a particular module can be either grouped together in memory or dispersed among more than one different region of memory.

Applicant hereby discloses in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicant indicates that aspects of the present disclosure may consist of any such feature or combination of features. In view of the foregoing description it will be evident to a person skilled in the art that various modifications may be made within the scope of the invention.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various implementations of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various implementations of the present disclosure as described above. Alternatively, one or more processors operating in accordance with stored instructions may implement the functions associated with the various implementations of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

The foregoing description of preferred implementations of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of implementations of the invention. In addition, any and all variations described, suggested or incorporated by reference herein with respect to any one implementation are also to be considered taught with respect to all other implementations. The implementations described herein were chosen and described in order to best explain the principles of the invention and its practical application, thereby enabling others skilled in the art to understand the invention for various implementations and with various modifications as are suited to the particular use contemplated. It is intended that the scope of the invention be defined by the following claims and their equivalents.

The invention claimed is:

1. A method of identifying an initial collection of k documents $I_1, I_2, \ldots, I_k$ from $n_1$ candidate documents $X_1, X_2, \ldots, X_{n1}$ in an embedding space, the initial collection of k documents $I_1, I_2, \ldots, I_k$ to be used for user identification of a desired document, the method comprising:
providing, accessibly to a computer system, a database identifying (i) the $n_1$ candidate documents $X_1, X_2, \ldots, X_{n1}$ in the embedding space and (ii) a distance between each pair of documents of the $n_1$ candidate documents $X_1, X_2, \ldots, X_{n1}$ in the embedding space, the distance between each pair of candidate documents corresponding to a predetermined measure of dissimilarity between the pair of candidate documents, wherein $n_1 > k > 1$;
identifying the k initial documents $I_1, I_2, \ldots, I_k$ to be identified to a user by, for each i'th one of k iterations, beginning with a first iteration (i=1), performing:
calculating a cost score for documents of the $n_i$ candidate documents $X_1, X_2, \ldots, X_{ni}$, the cost score being calculated according to an algorithm that operates in dependence on a representativeness calculation and a diversity calculation,
adding, to the initial collection of k documents $I_1, I_2, \ldots, I_k$, a minimum cost document, from the scored documents, having a lowest cost score, and removing, from the $n_i$ candidate documents $X_1$, $X_2, \ldots, X_{ni}$, the minimum cost document and all r documents that are within a predetermined distance from the minimum cost document, where r≥0, and $n_{i+1}$ being $n_i$— (r +1); and identifying toward the user the initial collection of k documents $I_1, I_2, \ldots, I_k$ for selection of a document.

2. The method of claim 1, wherein the representativeness calculation decreases the cost score for documents which are more representative of documents in the $n_i$ candidate documents, and increases the cost score for documents which are less representative of documents in the $n_i$ candidate documents, and wherein the diversity calculation decreases the cost score for documents which are more diverse from documents previously added to the initial collection and increases the cost score for documents which are less diverse from documents previously added to the initial collection.

3. The method of claim 2, wherein the representativeness calculation is calculated in dependence on a distance in the embedding space from the document being scored to a τ'th closest document in the $n_i$ candidate documents, where τ is a predetermined number greater than or equal to 1.

4. The method of claim 2, wherein the diversity calculation is calculated in dependence on an average distance between the document being scored from the documents previously added to the initial collection.

5. The method of claim 2, wherein the cost score applies a predetermined weighting factor to one of the diversity calculation and the representativeness calculation, relative to the other of the diversity calculation and the representativeness calculation.

6. The method of claim 5, wherein, as the predetermined weighting factor increases, diversity of the initial collection of k documents $I_1, I_2, \ldots, I_k$ increases, and as the predetermined weighting factor decreases, representativeness of the initial collection of k documents $I_1, I_2, \ldots, I_k$ increases.

7. The method of claim 2, wherein the representativeness calculation is calculated for each scored document in dependence upon the number of documents within the $n_i$ candidate documents $X_1, X_2, \ldots, X_{ni}$ that are within a fixed distance in the embedding space from the document being scored.

8. The method of claim 2, wherein the diversity calculation is calculated in dependence on a sum of eigenvalues of a covariance matrix of embeddings of the document being scored in the embedding space.

9. The method of claim 2, wherein the diversity calculation is calculated as $\alpha \|X_{0\text{-}meaned}\|_{L2}$ where α is a predetermined weighting factor, and $\|X_{0\text{-}meaned}\|_{L2}$ is a square root of a sum of squares of 0-meaned values of elements in a feature vector x representing the document being scored.

10. The method of claim 1, wherein the cost score for each scored document is calculated using a K-medoids algorithm as follows:

$$\text{cost}(C, c) = \sum_{X_i \in C} d(X_i, c)$$

where C is a cluster, c is the cost of the document X being scored and $X_i$ represents remaining documents in the cluster C.

11. The method of claim 1, wherein the cost score for each scored document is calculated using a K-medoids algorithm including a centered norm variance term as follows:

$$\text{cost}(C, c) = \sum_{X_i \in C} d(X_i, c) - \alpha \|X_{centered}\|_{L2}$$

where C is a cluster, c is the cost of the document being scored X, $X_i$ represents remaining documents in the cluster C, α is a predetermined weighting factor and $\|X_{centered}\|_{L2}$ is a square root of a sum of squares of centered values of elements in a feature vector x representing the document being scored X.

12. The method of claim 1, wherein the cost score for each scored document is calculated using a K-medoids with a mean distance term as follows:

$$\text{cost}(C, c) = \sum_{X_i \in C} d(X_i, c) - \alpha \frac{\sum_{X_j \in medoids} d(X, X_j)}{\text{count(medoids)}}$$

where C is a cluster, c is the cost of the document being scored X, $X_i$ represents remaining documents in the cluster C, α is a predetermined weighting factor and $$\frac{\sum_{X_j \in medoids} d(X, X_j)}{\text{count(medoids)}}$$

is an average distance between the document being scored X and documents included in a current set of medoids.

13. A computer-readable storage medium impressed in a non-transitory manner with computer program instructions for identifying an initial collection of k documents $I_1, I_2, \ldots, I_k$ from $n_i$ candidate documents $X_1, X_2, \ldots, X_{n1}$ in an embedding space, the initial collection of k documents $_1, I_2, \ldots, I_k$ to be used for user identification of a desired document, the computer program instructions, when executed, causing a computer to perform a method comprising:

providing, accessibly to a computer system, a database identifying (i) the $n_1$ candidate documents $X_1, X_2, \ldots, X_{n1}$ in the embedding space and (ii) a distance between each pair of documents of the $n_1$ candidate documents $X_1, X_2, \ldots, X_{n1}$ in the embedding space, the distance between each pair of candidate documents corresponding to a predetermined measure of dissimilarity between the pair of candidate documents, wherein $n_1$22 k>1 ;

identifying the k initial documents $I_1, I_2, \ldots, I_k$ to be identified to a user by, for each i'th one of k iterations, beginning with a first iteration (i-1), performing:

calculating a cost score for documents of the $n_i$ candidate documents $X_1, X_2, \ldots, X_{ni}$ the cost score being calculated according to an algorithm that operates in dependence on a representativeness calculation and a diversity calculation, adding, to the initial collection of k documents $I_1, I_2, \ldots, I_k$, a minimum cost document, from the scored documents, having a lowest cost score, and removing, from the $n_i$ candidate documents $X_1, X_2, \ldots, X_{ni}$, the minimum cost document and all r documents that are within a predetermined distance from the minimum cost document, where r≥0, and $n_{i+1}$ being $n_i$–(r +1); and identifying toward the user the initial collection of k documents $I_1, I_2, \ldots, I_k$ for selection of a document.

14. A system for identifying an initial collection of k documents $I_1, I_2, \ldots, I_k$ from $n_i$ candidate documents $X_1, X_2, \ldots, X_{n1}$ in an embedding space, the initial collection of k documents $I_1, I_2, \ldots, I_k$ to be used for user identification of a desired document, the system including:
   a processor;
   a memory storing the embedding space; and
   a computer-readable medium coupled to the processor, computer-readable medium having stored thereon, in a non-transitory manner, a plurality of software code portions defining logic for:
      a first module for providing, accessibly to a computer system, a database identifying (i) the $n_1$ candidate documents $X_1, X_2, \ldots, X_{n1}$ in the embedding space and (ii) a distance between each pair of documents of the $n_1$ candidate documents $X_1, X_2, \ldots, X_{n1}$ in the embedding space, the distance between each pair of candidate documents corresponding to a predetermined measure of dissimilarity between the pair of candidate documents, wherein $n_1>k>1$;
      a second module for identifying the k initial documents $I_1, I_2, \ldots, I_k$ to be identified to a user by, for each i'th one of k iterations, beginning with a first iteration (i=1), performing:
         calculating a cost score for documents of the ni candidate documents $X_1, X_2, \ldots, X_{ni}$ the cost score being calculated according to an algorithm that operates in dependence on a representativeness calculation and a diversity calculation,
         adding, to the initial collection of k documents $I_1, I_2, \ldots, I_k$, a minimum cost document, from the scored documents, having a lowest cost score, and removing, from the $n_i$ candidate documents $X_1, X_2, \ldots, X_{ni}$, the minimum cost document and all r documents that are within a predetermined distance from the minimum cost document, where $r \geq 0$, and $n_{i+1}$ being $n_i -(r +1)$; and
      a third module for identifying toward the user the initial collection of k documents $I_1, I_2, \ldots, I_k$ for selection of a document.

15. The system of claim 14, wherein the representativeness calculation decreases the cost score for documents which are more representative of documents in the $n_i$ candidate documents, and increases the cost score for documents which are less representative of documents in the $n_i$ candidate documents, and wherein the diversity calculation decreases the cost score for documents which are more diverse from documents previously added to the initial collection and increases the cost score for documents which are less diverse from documents previously added to the initial collection.

16. The system of claim 15, wherein the representativeness calculation is calculated in dependence on a distance in the embedding space from the document being scored to a $\tau$'th closest document in the $n_i$ candidate documents, where $\tau$ is a predetermined number greater than or equal to 1.

17. The system of claim 15, wherein the diversity calculation is calculated in dependence on an average distance between the document being scored from the documents previously added to the initial collection.

18. The system of claim 15, wherein the cost score applies a predetermined weighting factor to one of the diversity calculation and the representativeness calculation, relative to the other of the diversity calculation and the representativeness calculation.

19. The system of claim 18, wherein, as the predetermined weighting factor increases, diversity of the initial collection of k documents $I_1, I_2, \ldots, I_k$ increases, and as the predetermined weighting factor decreases, representativeness of the initial collection of k documents $I_1, I_2, \ldots, I_k$ increases.

20. The system of claim 15, wherein the representativeness calculation is calculated for each scored document in dependence upon the number of documents within the $n_i$ candidate documents $X_1, X_2, \ldots, X_{ni}$ that are within a fixed distance in the embedding space from the document being scored.

21. The system of claim 15, wherein the diversity calculation is calculated in dependence on a sum of eigenvalues of a covariance matrix of embeddings of the document being scored in the embedding space.

22. The system of claim 15, wherein the diversity calculation is calculated as $\alpha \|X_{0\text{-}meaned}\|_{L2}$, where $\alpha$ is a predetermined weighting factor, and $\|X_{0\text{-}meaned}\|_{L2}$ is a square root of a sum of squares of 0-meaned values of elements in a feature vector x representing the document being scored.

23. The system of claim 14, wherein the cost score for each scored document is calculated using a K-medoids algorithm as follows:

$$\text{cost}(C, c) = \sum_{X_i \in C} d(X_i, c)$$

where C is a cluster, c is the cost of the document X being scored and $X_i$ represents remaining documents in the cluster C.

24. The system of claim 14, wherein the cost score for each scored document is calculated using a K-medoids algorithm including a centered norm variance term as follows:

$$\text{cost}(C, c) = \sum_{X_i \in C} d(X_i, c) - \alpha \|X_{centered}\|_{L2}$$

where C is a cluster, c is the cost of the document being scored X, $X_i$ represents remaining documents in the cluster C, $\alpha$ is a predetermined weighting factor and $\|X_{centered}\|_{L2}$ is a square root of a sum of squares of centered values of elements in a feature vector x representing the document being scored X.

25. The system of claim 14, wherein the cost score for each scored document is calculated using a K-medoids with a mean distance term as follows:

$$\text{cost}(C, c) = \sum_{X_i \in C} d(X_i, c) - \alpha \frac{\sum_{X_j \in medoids} d(X, X_j)}{\text{count(medoids)}}$$

where C is a cluster, c is the cost of the document being scored X, $X_i$ represents remaining documents in the cluster C, $\alpha$ is a predetermined weighting factor and $$\frac{\sum_{X_j \in medoids} d(X, X_j)}{\text{count(medoids)}}$$

is an average distance between the document being scored X and documents included in a current set of medoids.

26. A method for user identification of a desired document, comprising:
providing, accessibly to a computer system, a database identifying (i) $n_0$ candidate documents $X_1, X_2, \ldots, X_{n0}$ in an embedding space and (ii) a distance between each pair of documents of the $n_0$ candidate documents $X_1, X_2, \ldots, X_{n0}$ in the embedding space, the distance between each pair of candidate documents corresponding to a predetermined measure of dissimilarity between the pair of candidate documents;
identifying an initial (j=0) collection of k documents $I_1, I_2, \ldots, I_k$, $n_0 > k > 1$, from the $n_0$ candidate documents $X_1, X_2, \ldots, X_{n0}$ by, for each i'th one of k iterations, beginning with a first iteration (i=1), performing:
calculating a cost score for documents of the $n_i$ candidate documents $X_1, X_2, \ldots, X_{ni}$, the cost score being calculated according to an algorithm that operates in dependence on a representativeness calculation and a diversity calculation,
adding, to the initial collection of k documents $I_1, I_2, \ldots, I_k$, a minimum cost document, from the scored documents, having a lowest cost score, and
removing, from the $n_i$ candidate documents $X_1, X_2, \ldots, X_{ni}$, the minimum cost document and all r documents that are within a predetermined distance from the minimum cost document, where r≥0, and $n_{i+1}$ being $n_i-(r+1)$;
a computer system identifying the initial (j=0) collection of k documents toward the user;
for each j'th iteration in a plurality of iterations, beginning with a first iteration (j=1):
in response to user selection of a j'th selected subset of the documents from the (j−1)'th collection of documents, and in dependence upon the j'th selected subset, a computer system identifying a j'th candidate space of $n_j$ candidate documents from the (j−1)'th candidate space of $n_{j-1}$ candidate documents, the j'th candidate space being smaller than the (j−1)'th candidate space,
identifying a j'th collection of documents which is a subset of the j'th candidate space of $n_j$ candidate documents, and
identifying toward the user the j'th collection of documents; and
taking action in response to user indicating commitment to a particular collection of documents identified toward the user.

27. A system for user identification of a desired document, the system including:
a processor;
a memory storing accessibly to a computer system, a database identifying (i) no candidate documents $X_1, X_2, \ldots, X_{n0}$ in an embedding space and (ii) a distance between each pair of documents of the $n_0$ candidate documents $X_1, X_2, \ldots, X_{n0}$ in the embedding space, the distance between each pair of candidate documents corresponding to a predetermined measure of dissimilarity between the pair of candidate documents; and
a computer-readable medium coupled to the processor, computer-readable medium having stored thereon, in a non-transitory manner, a plurality of software code portions defining logic for:
a first module which identifies an initial (j=0) collection of k documents $I_1, I_2, \ldots, I_k$, $n_0 > k > 1$, from the $n_0$ candidate documents $X_1, X_2, \ldots, X_{n0}$ by, for each i'th one of k iterations, beginning with a first iteration (i=1), the first module performing:
calculating a cost score for documents of the $n_i$ candidate documents $X_1, X_2, \ldots, X_{ni}$, the cost score being calculated according to an algorithm that operates in dependence on a representativeness calculation and a diversity calculation,
adding, to the initial collection of k documents $I_1, I_2, \ldots, I_k$, a minimum cost document, from the scored documents, having a lowest cost score, and
removing, from the $n_i$ candidate documents $X_1, X_2, \ldots, X_{ni}$, the minimum cost document and all r documents that are within a predetermined distance from the minimum cost document, where r≥0, and $n_{i+1}$ being $n_i-(r+1)$;
a second module which identifies the initial (j=0) collection of k documents toward the user;
a third module which, for each j'th iteration in a plurality of iterations, beginning with a first iteration (j=1), performs:
in response to user selection of a j'th selected subset of the documents from the (j-31 1)'th collection of documents, and in dependence upon the j'th selected subset, a computer system identifying a j'th candidate space of $n_j$ candidate documents from the (j−1)'th candidate space of $n_{j-1}$ candidate documents, the j'th candidate space being smaller than the (j−1)'th candidate space,
identifying a j'th collection of documents which is a subset of the j'th candidate space of $n_j$ candidate documents, and
identifying toward the user the j'th collection of documents; and
a fourth module which takes action in response to user indicating commitment to a particular collection of documents identified toward the user.

\* \* \* \* \*